(12) United States Patent
Fujita et al.

(10) Patent No.: US 7,339,455 B2
(45) Date of Patent: Mar. 4, 2008

(54) PLATINUM RESISTOR TEMPERATURE SENSOR

(75) Inventors: Koichi Fujita, Aichi (JP); Masatoshi Ueki, Aichi (JP); Hitoshi Yokoi, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 314 days.

(21) Appl. No.: 11/074,075

(22) Filed: Mar. 8, 2005

(65) Prior Publication Data

US 2005/0200448 A1 Sep. 15, 2005

(30) Foreign Application Priority Data

Mar. 8, 2004 (JP) .............................. 2004-064095

(51) Int. Cl.
*H01C 3/04* (2006.01)
(52) U.S. Cl. ...................................................... 338/25
(58) Field of Classification Search ................... 338/4, 338/22 R, 25, 28, 237, 252, 277, 309
See application file for complete search history.

(56) References Cited

U.S. PATENT DOCUMENTS

| 5,142,266 | A | * | 8/1992 | Friese et al. ............. 338/22 R |
|---|---|---|---|---|
| 5,172,466 | A | | 12/1992 | Friese et al. |
| 5,181,007 | A | | 1/1993 | Friese et al. |
| 5,321,386 | A | * | 6/1994 | Ishiguro ...................... 338/269 |
| 5,430,428 | A | | 7/1995 | Gerblinger et al. |
| 5,735,606 | A | * | 4/1998 | Tani et al. ...................... 338/25 |
| 5,831,512 | A | * | 11/1998 | Wienand et al. ............... 338/25 |
| 6,353,381 | B1 | | 3/2002 | Dietmann et al. |
| 6,617,956 | B1 | * | 9/2003 | Zitzmann ...................... 338/25 |
| 6,653,926 | B1 | | 11/2003 | Zitzmann |
| 2004/0085183 | A1 | * | 5/2004 | Ha et al. ...................... 338/309 |

FOREIGN PATENT DOCUMENTS

| DE | 37 33 192 C1 | 10/1988 |
|---|---|---|
| DE | 199 01 184 C1 | 10/2000 |
| EP | 0571412 | 12/1993 |
| JP | 2002-535609 | 10/2002 |

\* cited by examiner

*Primary Examiner*—Elvin Enad
*Assistant Examiner*—Joselito S. Baisa
(74) *Attorney, Agent, or Firm*—Sughrue Mion, PLLC

(57) ABSTRACT

A platinum temperature sensor incorporating an evaporation-suppressing layer containing platinum in the vicinity of the platinum thin-film resistor of the sensor. The evaporation-suppressing layer is preferably positioned between the platinum resistor and a porous layer that is formed close to the platinum resistor and in contact with the evaporation-suppressing layer.

19 Claims, 26 Drawing Sheets

PLATINUM RESISTOR TEMPERATURE SENSOR

BACKGROUND OF THE INVENTION

1. Field of the Invention

The present invention relates to a platinum resistor temperature sensor.

2. Description of the Related Art

A conventional platinum temperature sensor as disclosed in U.S. Pat. No. 6,653,926 comprises a ceramic substrate; a platinum resistor formed of a meandering thin-film line provided on the ceramic substrate; a ceramic cover layer covering the platinum resistor; and a connecting layer for connecting the ceramic substrate so that the platinum resistor is encapsulated.

A process for manufacturing the aforementioned platinum temperature sensor includes applying a pressure to a ceramic green layer that becomes the connecting ceramic layer so that the platinum thin-film resistor is encapsulated between the ceramic substrate and the ceramic cover layer.

In the aforementioned conventional platinum temperature sensor, since the ceramic cover layer is connected to the ceramic substrate by the connecting ceramic layer that is made by applying a pressure and temperature to a green ceramic layer, as described in U.S. Pat. No. 6,653,926, an air-tight platinum temperature sensor capable of preventing the platinum thin-film resistor from an outer gas atmosphere entering inside is supposedly obtained.

However, when the above-described platinum temperature sensor is actually placed in an exhaust pipe of an internal combustion engine in order to detect the temperature of the exhaust gas exhausted therefrom, the platinum temperature sensor is exposed to a very high temperature exhaust gas possibly exceeding more than 1000° C. On this occasion, a small amount of a high-temperature oxidative gas of the exhaust gas passes through an interface between the ceramic cover layer and the connecting layer, through an interface between the ceramic substrate and the connecting layer or through the connecting layer per se having some porosity, and reaches the platinum thin-film resistor. As a result, a small amount of the platinum of the resistor evaporates, thereby increasing the resistance value of the platinum resistor in the long run, or in a worst case, losing the resistance across the terminals of the platinum temperature sensor.

SUMMARY OF THE INVENTION

Accordingly, it is an object of the present invention to solve these problems and provide a durable and improved platinum resistor temperature sensor capable of suppressing or even preventing platinum-evaporation of a platinum resistor thereof even when it is exposed to a high-temperature oxidative gas atmosphere, such as an exhaust gas from an internal combustion engine.

The above object of the invention has been achieved by providing a platinum temperature sensor comprising: a ceramic substrate; a platinum resistor provided on the substrate; a porous layer provided on at least one portion of a circumference of the platinum resistor; and an evaporation-suppressing layer for suppressing the evaporation of the platinum of the platinum resistor provided in the vicinity of the platinum resistor.

A characteristic feature of the invention is that the evaporation-suppressing layer for suppressing or even preventing the evaporation of the platinum of the platinum resistor is provided in the vicinity of the platinum resistor so that the resistance of the platinum layer does not increase due to thinning of the platinum resistor caused by evaporation of the platinum. Importantly, the evaporation-suppressing layer comprises platinum, according to a first aspect of the invention.

More detailed functions and advantages of the invention are as follows.

At the time of detecting the temperature of a gas containing a high-temperature oxidative gas, such as an exhaust gas of an internal combustion engine, by disposing the platinum temperature sensor of the invention in the gas, a high-temperature oxidative gas enters the platinum temperature sensor through the porous layer or through any tiny hole of the encapsulation and reaches the evaporation-suppressing layer and the platinum resistor. On this occasion, a platinum vapor pressure is generated mainly by the evaporation of the platinum of the evaporation-suppressing layer which increases the platinum vapor in the vicinity of the platinum resistor. Although the platinum of the platinum resistor also tends to evaporate by the influence of the high-temperature oxidative gas that has entered the temperature sensor, the platinum vapor pressure generated largely from the evaporation-suppressing layer reduces the evaporation of the platinum from the platinum resistor, because the high platinum vapor pressure already formed at the vicinity of the platinum resistor by the evaporation of the platinum of the evaporation-suppressing layer sacrifices for the platinum of the platinum resistor which would otherwise evaporate.

In other words, instead of the platinum resistor, the evaporation-suppressing layer evaporates, or even preventing the evaporation of the platinum resistor. Therefore, even when the high-temperature oxidative gas in the atmosphere reaches the platinum resistor, the platinum resistor is scarcely evaporated. Accordingly, the platinum resistor retains its external shape from immediately after the production thereof and maintains its normal resistance value for a long time. As a result, good accuracy in the temperature detection of the gas by using the platinum temperature sensor is maintained over a long period of time.

In a second aspect of the present invention, the evaporation-suppressing layer is provided between the porous layer and the substrate. This placement of the evaporation-suppressing layer is easy to achieve during actual production of the sensor.

Further, according to a third aspect of the present invention, in the platinum resistor temperature sensor according to the second aspect:

the substrate extends outward farther than the porous layer; and the evaporation-suppressing layer, which is provided on at least one portion of the circumference of the platinum resistor, extends to or is separately situated on a portion of the substrate which extends outward farther than the porous layer. Therefore, the evaporation-suppressing layer not only facilitates formation of the porous layer but also achieves the same effect as in the invention according to the second aspect by the evaporation of the evaporation-suppressing layer.

Further, according to a fourth aspect of the present invention, in the platinum resistor temperature sensor according to the second or third aspect:

the platinum resistor is provided on the substrate in a meander manner; and the evaporation-suppressing layer is provided in a manner that corresponds to at least one end portion of the platinum resistor in the meander direction.

According to the above-described aspect, even when the end portion of the platinum resistor in the meander direction is formed such that it is easily evaporated compared with other portions of the platinum resistor, for example, in an angled shape, since, as described above, the evaporation-suppressing layer is provided in a manner that corresponds to at least one end portion of the platinum resistor in the meander direction, the platinum vapor pressure generated by the evaporation of the evaporation-suppressing layer becomes particularly high in the at least one end portion of the platinum resistor in the meander direction and, then, the evaporation of the end portion thereof in the meander direction is favorably suppressed. As a result, the effect of the invention according to the second or third aspect is more specifically achieved.

Still further, according to a fifth aspect of the present invention, the platinum resistor temperature sensor according to the fourth aspect further comprises both leads (30) provided opposing to each other on the substrate in a manner that extends in the meander direction of the platinum resistor from both connection end portions (21) situated in at least an end portion of the platinum resistor in the meander direction, in which the evaporation-suppressing layer is provided in a manner that encloses the platinum resistor in a horseshoe shape or rather in a shape of a square deprived of one side from the side of an end portion of the platinum resistor in the meander direction opposite to the both leads.

According to the above-described aspect, since the evaporation-suppressing layer is provided in a manner that encloses the platinum resistor in a shape of a square deprived of one side from the side of the end portion of the platinum resistor in the meander direction opposite to both leads, the evaporation of the platinum resistor is more favorably suppressed. As a result, the effect of the invention according to the fourth aspect is more specifically achieved.

Still further, according to a sixth aspect of the present invention, the platinum resistor temperature sensor according to one of the first to fifth aspects further comprises a covering lid layer (60) provided on the porous layer comprising a material comprising a ceramic as a main component.

According to the above-described aspect, the covering lid layer is firmly attached on the substrate in a manner that covers the platinum resistor via the evaporation-suppressing layer. Thus, the platinum resistor is more surely blocked from the atmosphere containing the high-temperature oxidative gas by the covering lid layer together with the evaporation-suppressing layer. As a result, the effect of the invention according to one of the first to fifth aspects is further enhanced.

Even further, according to a seventh aspect of the present invention, the platinum resistor temperature sensor according to the sixth aspect has the evaporation-suppressing layer provided on at least one portion between the porous layer and the covering lid layer.

As described above, regardless of the constitution in which the evaporation-suppressing layer is provided on at least one portion between the porous layer and the covering lid layer, the substantially same effect as in the invention according to the first aspect can be achieved.

Furthermore, according to an eighth aspect of the present invention, the platinum resistor temperature sensor according to the sixth or seventh aspect further comprises a sealing layer formed of a glass material in a manner that covers an outer circumferential face of the porous layer.

According to the above-described aspect, an atmosphere of, for example, the exhaust gas of the internal combustion engine is blocked from the platinum resistor by the seal of the sealing layer. As a result, the evaporation of the platinum resistor due to the influence of the high-temperature oxidative gas in the above-described atmosphere is further suppressed.

Still furthermore, the platinum resistor temperature sensor according to the present invention comprise:

a covering lid (300) formed of a material comprising a ceramic as a main component;

a substrate (360) comprising a material comprising a ceramic as a main component;

a platinum resistor (350) provided on a rear face of the substrate;

a porous layer (340), which is provided on the covering lid, and comes in contact with the rear face of the substrate via the platinum resistor;

an evaporation-suppressing layer (330), which is provided on at least one portion of a circumference of the platinum resistor, between the covering lid layer and the porous layer; and both leads (310 and 320), which are provided on other portions than the at least one portion of the circumference of the platinum resistor, on the covering lid, in which the covering lid layer extends outward farther than the porous layer;

the evaporation-suppressing layer extends to, or is separately situated on, a portion of the covering lid layer, which extends outward farther than the porous layer; and both leads, as well as the evaporation-suppressing layer, are formed of platinum.

Although the constitution described above is different from that in the invention according to the first aspect in that the substrate and the covering lid layer are replaced with each other, the same effect as in the invention according to the third aspect is achieved by evaporation of the evaporation-suppressing layer and both leads.

Further, the reference numerals in brackets in the above-described devices correspond to those from specific devices of embodiments to be described below.

Figure 1:
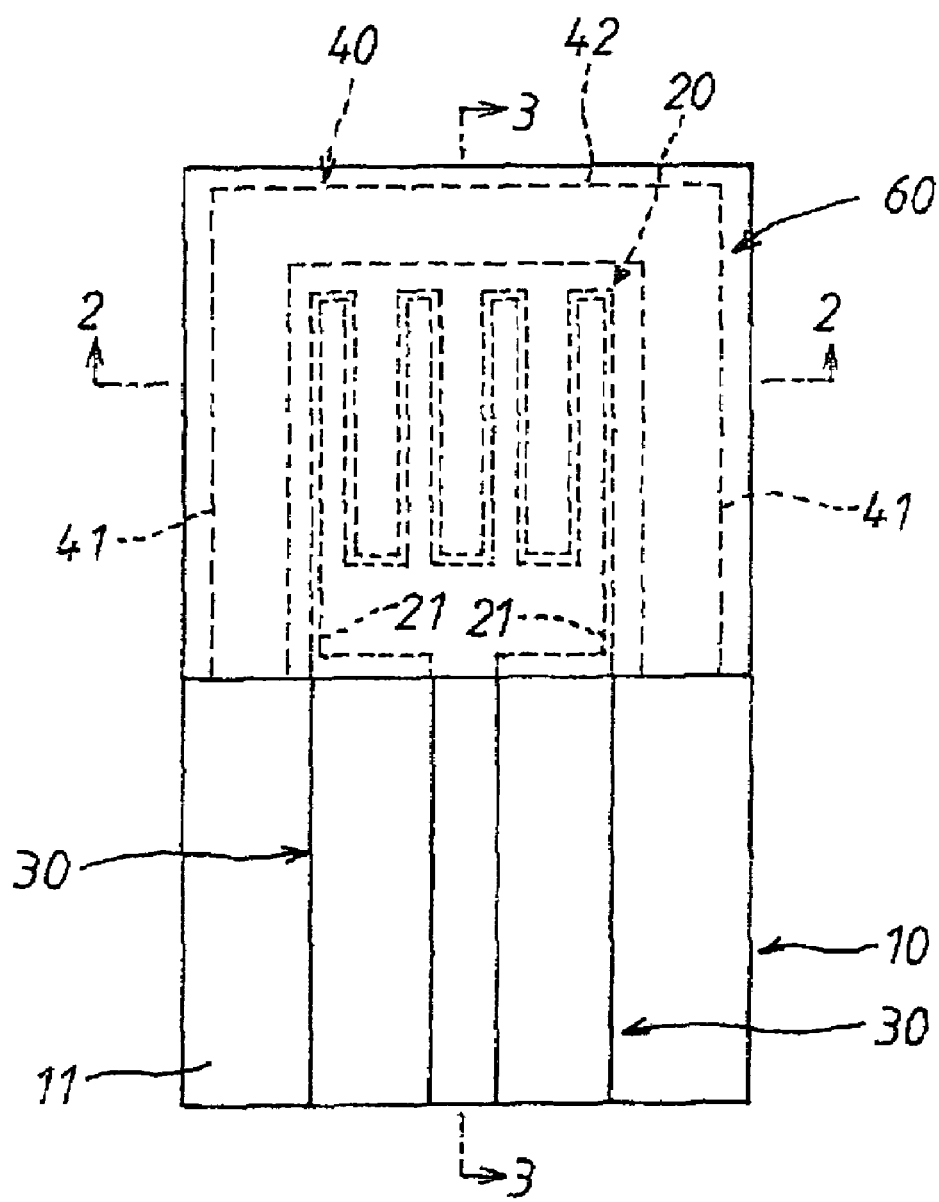
FIG. 1 is a plan view showing a first embodiment of a platinum resistor temperature sensor according to the present invention.

DESCRIPTION OF REFERENCE NUMERALS AND SIGNS 10, 360 substrate
11, 361 surface of substrate
20, 350 platinum resistor
21, 351 connection end portion
30, 90, 100, 310, 320 lead
40, 150, 330 evaporation suppressing layer
50, 340 adhesive layer
60, 300 covering lid layer
91, 94, 101, 104, 311 lead portion
160, 180 sealing layer

DETAILED DESCRIPTION OF THE PREFERRED EMBODIMENTS

Hereinafter, embodiments according to the present invention are described with reference to the drawings. However, the present invention should not be construed as being limited thereto.

First Embodiment

Figure 2:
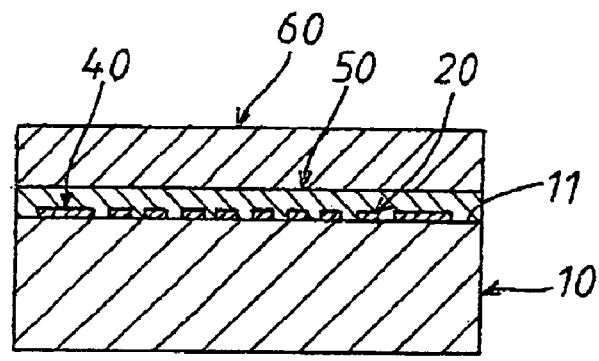
FIG. 2 is a cross-sectional view taken on line 2-2 in FIG. 1.
Figure 3:
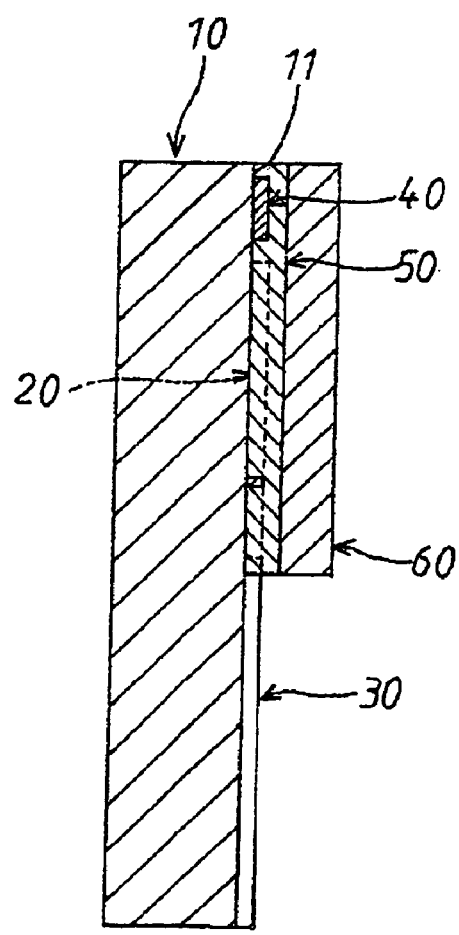
FIG. 3 is a cross-sectional view taken on line 3-3 in FIG. 1.

FIGS. 1 to 3 show a first embodiment of a platinum resistor temperature sensor according to the present invention. The temperature sensor comprises a substrate 10. The substrate 10 is formed of a material comprising alumina ($Al_2O_3$) of high purity in such a manner that it has a dense structure. Further, in the present first embodiment, as the material (hereinafter, referred to also as "high-purity alumina material) containing the above-described alumina of high purity, a material containing 99.9 (%) or more of alumina is employed. Still further, the substrate 10 also performs the role of a support plate of the temperature sensor.

Still further, the temperature sensor comprises a platinum resistor 20, both leads 30 and an evaporation suppressing layer 40 in a strip shape. The platinum resistor 20 is formed, as shown in FIGS. 1 and 3, on a center portion of an upper-side portion shown in the figure (hereinafter, referred to also as "platinum resistor-side portion") on a surface 11 of the substrate 10. On this occasion, the platinum resistor 20, which comprises platinum (Pt), is formed on the surface 11 of the substrate 10 so as to take a meander shape in a direction from top to bottom shown in FIG. 1, from left to right shown in the figure. Under these arrangements, the platinum resistor 20 is formed such that left and right lower end portions shown in FIG. 1 are allowed to be left-side and right-side connection end portions 21.

Both leads 30, which perform roles as electrodes for connecting with an exterior circuit, are formed, as shown in FIG. 1, along a direction of from top to bottom by using platinum (Pt), such that they are parallel to each other on a center portion of a lower-side portion shown on the figure (hereinafter referred to also as "lead-side portion") in the surface 11 of the substrate 10. A left-side lead 30 shown in FIG. 1 of leads 30 is formed in unity with the left-side connection end portion 21 of the platinum resistor 20 at an upper-end left-side corner-angled portion thereof shown in the figure, while a right-side lead 30 is formed in unity with the right-side connection end portion 21 of the platinum resistor 20 at an upper-end right-side corner-angled portion thereof shown in the figure.

The evaporation-suppressing layer 40, which comprises platinum (Pt), is formed, as shown in FIG. 1, in the shape of a square deprived of one side extending on an outer circumferential portion of the above-described platinum resistor-side portion on the surface 11 of the substrate 10 in a manner that encloses the circumference of the platinum resistor 20 from the side of the left-side connection end portion 21 to the side of the right-side connection end portion 21. For this account, in the evaporation-suppressing layer 40, a platinum vapor pressure is generated by the evaporation of platinum, which is a forming material of the layer 40, and, accordingly, the evaporation-suppressing layer 40 performs the role of suppressing the evaporation of the platinum resistor 20. Further, in FIG. 1, both left- and right-side portions 41 (as shown in the figure) of the evaporation-suppressing layer 40 are situated along the meander direction of the platinum resistor 20, while an upper-side portion 42 (shown in the figure) of the evaporation-suppressing layer 40 is situated facing each upper-side meander end portion of the platinum resistor 20.

Still further, the temperature sensor comprises an adhesive layer 50 and a covering lid layer 60. The adhesive layer 50 is, as shown in FIGS. 2 and 3, adhere-formed on the platinum resistor side portion on the surface 11 of the substrate 10 in a manner that encloses the platinum resistor 20 and the evaporation suppressing layer 40. On this occasion, the evaporation-suppressing layer 40 is in contact with the adhesive layer 50. In the present first embodiment, the adhesive layer 50 is formed, in the same manner as substrate 10, by using a high-purity alumina material so as to have a porous structure. The covering lid layer 60, which is formed, in the same manner as substrate 10, by using a high-purity alumina material, is laminated on the adhesive layer 50, and performs the role, together with the adhesive layer 50, of a protective layer of the platinum resistor 20.

A production method of the temperature sensor constituted as described above will be described with reference to FIGS. 4 to 11.

Figure 4:
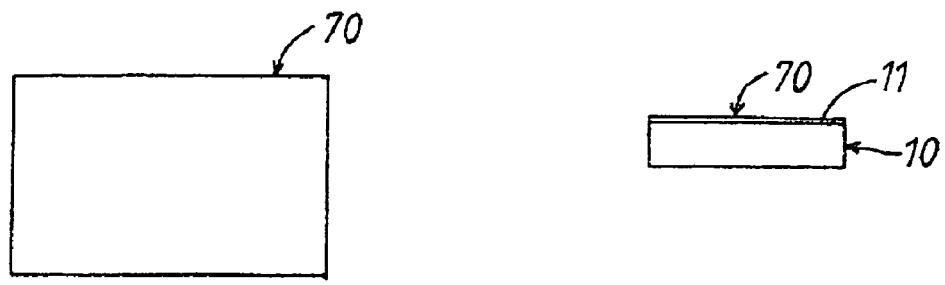
FIG. 4 is a diagram showing a process of forming a platinum film by sputtering in the production process of the first embodiment observed from a plane side and a side face side.
Figure 5:
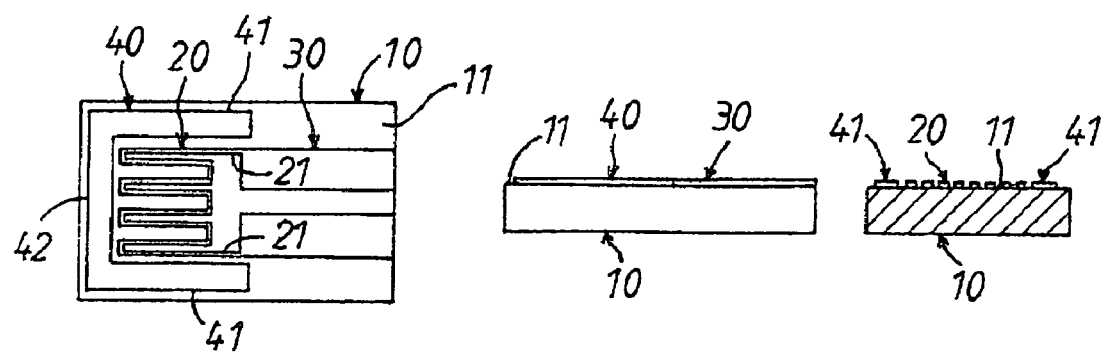
FIG. 5 is a diagram showing a process of patterning and formation of a platinum resistor, an evaporation-suppressing layer and both leads in the production process of the first embodiment observed from a plane side and a side face side.
Figure 6:
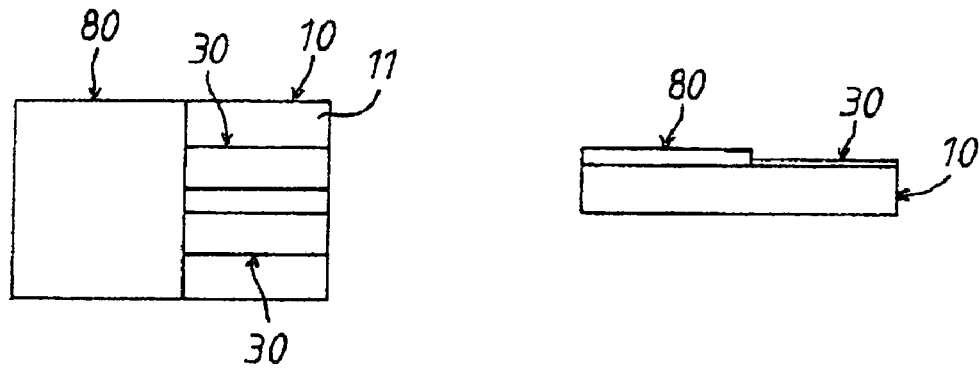
FIG. 6 is a diagram showing a process of forming a paste layer which becomes an adhesive layer in the production process of the first embodiment observed from a plane side and a side face side.
Figure 7:
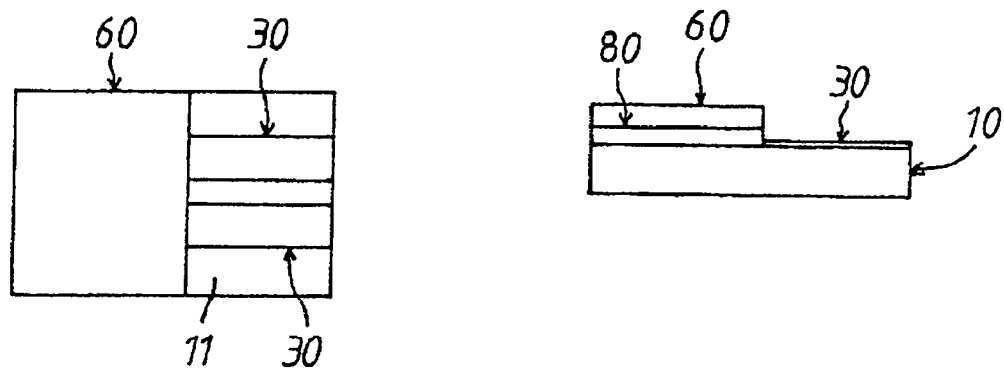
FIG. 7 is a diagram showing a process of laminating a covering lid layer in the production process of the first embodiment observed from a plane side and a side face side.

First, a platinum film 70 in a thin film (for example, film thickness: 1.2 μm) state is formed by using platinum (Pt) over an entire face of the surface 11 of the substrate 10 comprising the high-purity alumina material by means of sputtering (see, in FIG. 4, a plan view shown at left side in the figure and a side view shown at right side in the figure). Incidentally, the substrate 10 is formed by using the high-purity alumina material so as to have a dense structure.

Thereafter, the platinum film 70 is subjected to a predetermined patterning treatment by photolithography processing to thereby form the platinum resistor 20, both leads 30 and the evaporation-suppressing layer 40 on the surface 11 of the substrate 10 in a thin film state in such a manner that it has a constitution as described above (see, in FIG. 5, a plan view shown at a left-side, a side view shown at a center side and a cross-sectional view shown at a right side and, also, FIGS. 1 to 3).

The platinum resistor 20, both leads 30 and the evaporation-suppressing layer 40 pattern-formed on the surface 11 of the substrate 10 as described above, including left- and right-side portions 41 and upper-side portion 42 of the evaporation-suppressing layer 40, are subjected to an aging treatment and, then, the high-purity alumina material is applied or screen-printed in a paste state on the platinum resistor side portion (see, in FIG. 6, a plan view shown at left side in the figure and a side view shown at right side in the figure) on the surface 11 of the substrate 10 via the platinum resistor 20 and the evaporation-suppressing layer 40, to thereby form a paste layer 80 which comes to be the adhesive layer 50. Next, the covering lid layer 60 is laminated on the paste layer 80 (see, in FIG. 7, a plan view shown at right side in the figure and a side view shown at left side in the figure).

A structure in which the covering lid layer 60 is laminated on the surface 11 of the substrate 10 via the paste layer 80, the platinum resistor 20 and the evaporation-suppressing layer 40 is fired in an atmosphere (hereinafter, referred to also as "firing atmosphere") of a predetermined high temperature (for example, 1150 (° C.) to 1300 (° C.)). By such firing, a production of the temperature sensor is terminated. Further, it is also permissible that the covering lid layer 60 is fired in a state of being pressed on the surface 11 of the substrate 10 with a predetermined pressure.

In the temperature sensor produced as described above, the paste layer 80 becomes the adhesive layer 50 and, then, is adhered on the surface 11 of the substrate 10 and, also, the covering lid layer 60 is adhered on the adhesive layer 50. For this account, the covering lid layer 60 is firmly adhered on the platinum resistor side portion on the surface 11 of the substrate 10 by the adhesive layer 50.

On this occasion, the platinum resistor 20 and the evaporation-suppressing layer 40 are held on the surface 11 of the substrate 10 in a state of being covered by the adhesive layer 50. In such constitution as described above, the platinum resistor 20 is enclosed by the evaporation-suppressing layer 40 from the left-side connection end portion 21 thereof to the right-side connection end portion 21 thereof.

Therefore, in a process of firing in the firing atmosphere as described above, a high-temperature oxidative gas in the firing atmosphere passes through from an outer circumference of the adhesive layer 50 to an interface between the adhesive layer 50 and the substrate 10 or an interface between the adhesive layer 50 and the covering lid layer 60 and reaches the evaporation-suppressing layer 40 and the platinum resistor 20. On this occasion, since the evaporation-suppressing layer 40 is formed on the circumference of the platinum resistor 20 as described above, a majority of the high-temperature oxidative gas firstly reaches the evaporation-suppressing layer 40. Further, since the evaporation-suppressing layer 40 is formed by using platinum, the evaporation-suppressing layer 40 is evaporated by an influence of the high-temperature oxidative gas in the firing atmosphere. For this account, a platinum vapor pressure generated by the evaporation of the evaporation-suppressing layer 40 becomes high in the vicinity of the platinum resistor 20.

Further, since the platinum resistor 20 is formed by using platinum in the same manner as the evaporation-suppressing layer 40, the platinum resistor 20 also tends to be evaporated by the high-temperature oxidative gas in the firing atmosphere. However, as described above, since the platinum vapor pressure generated by the evaporation of the evaporation-suppressing layer 40 is high in the vicinity of the platinum resistor 20, the platinum vapor pressure favorably suppresses the evaporation of the platinum resistor 20.

Therefore, when the high-temperature oxidative gas in the firing atmosphere reaches the platinum resistor 20, the platinum resistor 20 is scarcely evaporated. As a result, in the production process of the temperature sensor, when such firing treatment as described above is performed, the platinum resistor 20 retains its external shape from just before firing and maintains its normal resistance value.

Further, since the substrate 10 is formed by using the high-purity alumina material as described above, there are less pinholes in the substrate 10, the time period of the etching treatment for the pattern formation of the platinum resistor 20, the evaporation-suppressing layer 40 or both leads 30 can be short and, accordingly, generation of side-etching is comparatively small. As a result, the variation of performance among platinum resist temperature sensors is reduced.

Still further, since the substrate 10 is formed by using high-purity alumina material as described above, a reaction of the substrate 10 with impurities of platinum occurs less frequently, to thereby enhance durability of the platinum resistor 20.

Even still further, since the substrate 10 is formed by using high-purity alumina material as described above, at the time of pattern-forming the platinum resistor 20 or the evaporation-suppressing layer 40, the film thickness thereof can be uniform. For this account, the adhesive layer 50 can more favorably be formed on the surface 11 of the substrate 10 via the platinum resistor 20 or the evaporation-suppressing layer 40. By these arrangements, adhesion between the adhesive layer 50 and the surface 11 of the substrate 10 is improved and, as a result, it is harder for air external to the temperature sensor to enter the interface between the adhesive layer 50 and the substrate 10 and, accordingly, the platinum resistor 20 is not oxidized by a component (for example, an oxygen component) of the external air.

Next, an example of temperature detection by using the temperature sensor produced in the manner described above will be described. The temperature sensor is disposed in an exhaust pipe of an internal combustion engine mounted on an automobile. In such a state as described above, when the automobile is allowed to run, the internal combustion engine exhausts the exhaust gas through the exhaust pipe. Since a temperature of this exhaust gas is high (for example, 1000 (° C.)), the temperature sensor is forced to be exposed to an atmosphere of high-temperature exhaust gas.

In such a state as described above, the high-temperature oxidative gas in the exhaust gas atmosphere, as in substantially the same manner as described above, passes through the adhesive layer 50, the interface between the adhesive layer 50 and the substrate 10 or the interface between the adhesive layer 50 and the covering lid layer 60 and reaches the evaporation-suppressing layer 40 or the platinum resistor 20. On this occasion, since the evaporation-suppressing layer 40, as described above, is formed by using platinum, the evaporation-suppressing layer 40 is evaporated by the high-temperature oxidative gas in the exhaust gas atmosphere. For this account, the platinum vapor pressure generated by the evaporation of the evaporation-suppressing layer 40 becomes high in the vicinity of the platinum resistor 20.

Further, the platinum resistor 20, as described above, is formed by using platinum, and the platinum resistor 20 also tends to be evaporated by the influence of the high-temperature oxidative gas in the exhaust gas atmosphere. However, as described above, since the platinum vapor pressure caused by the evaporation of the evaporation-suppressing layer 40 becomes high in the vicinity of the platinum resistor 20, the platinum vapor pressure suppresses the evaporation of the platinum resistor 20.

Therefore, even when the high-temperature oxidative gas in the exhaust gas atmosphere reaches the platinum resistor 20, the platinum resistor 20 is scarcely evaporated. Accordingly, in the detection process of the temperature of the exhaust gas by the temperature sensor, the platinum resistor 20 retains its external shape from just immediately after the production thereof, does not become thin and maintains its normal resistance value. This means that the temperature sensor can favorably maintain a high-temperature durability for a long period of time. As a result, with the temperature sensor, a high temperature in the exhaust gas of the internal combustion engine can favorably be detected with good precision.

Now, in order to evaluate the high-temperature durability of the temperature sensor according to the present first embodiment, four comparative examples (hereinafter, referred to also as "Comparative Examples 1 to 4") were prepared and durability tests for the temperature sensors of the respective Comparative Examples and the present first embodiment were conducted. The durability test was a test in which the temperature sensor of each of the Comparative Examples and the present first embodiment was exposed to an atmosphere of 1000 (° C.) containing an oxidative gas in a furnace for 150 hours. The Comparative Examples have the respective constitutions described below.

Figure 8:
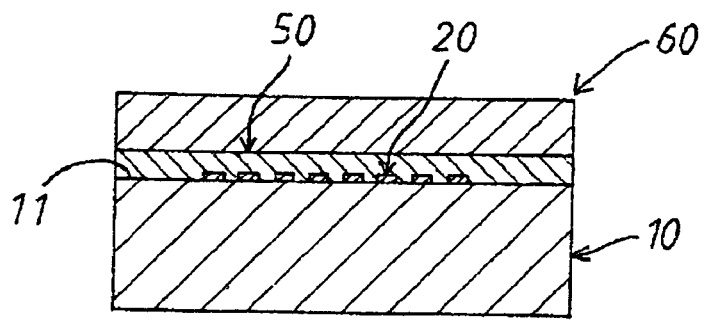
FIG. 8 is a cross-sectional view showing a Comparative Example 1 in the first embodiment.

Comparative Example 1 is, as shown in FIG. 8, prepared by the same production process as the temperature sensor according to the present first embodiment, except that the evaporation-suppressing layer 40 in the present first embodiment was not used. Further, the covering lid layer 60 and the adhesive layer 50 are formed on the platinum resistor side portion on the surface 11 of the substrate 10 in a manner that covers only the platinum resistor 20.

Figure 9:
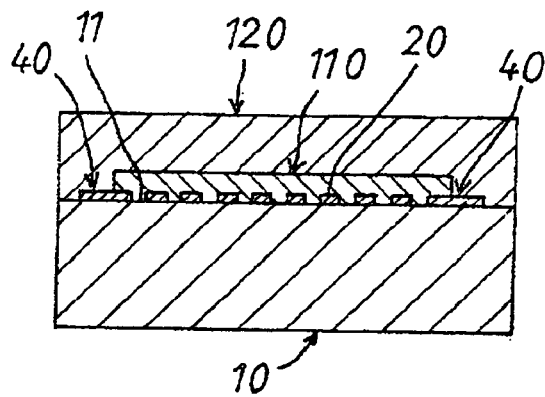
FIG. 9 is a cross-sectional view showing a Comparative Example 2 in the first embodiment.

Comparative Example 2 is prepared in a manner such that it has the constitution shown in FIG. 9. Namely, the platinum resistor 20 and the evaporation-suppressing layer 40 are pattern-formed on the platinum resistor side portion on the surface 11 of the substrate 10 in the same manner as the temperature sensor according to the present first embodiment and, then, subjected to an aging treatment. Thereafter, high-purity alumina material is screen-printed in a paste state on the platinum resistor side portion on the surface 11 of the substrate 10 in a manner that covers an inner circumferential portion of each of the platinum resistor 20 and the evaporation-suppressing layer 40, to thereby pattern-form a paste layer which becomes an inside protective layer 110.

Next, AP5710-crystallized glass (trade name) available from Asahi Glass Co., Ltd. is screen-printed in a paste state on the platinum resistor side portion on the surface 11 of the substrate 10 in a manner that covers an outer circumferential portion of the evaporation-suppressing layer 40 and the paste layer which becomes the inside protective layer 110, to thereby pattern-form a paste layer which becomes an outside protective layer 120 having a cross-section in a horse shoe shape or rather in a shape of a square deprived of one side. Thereafter, the resultant article is fired, to thereby prepare Comparative Example 2.

Figure 10:
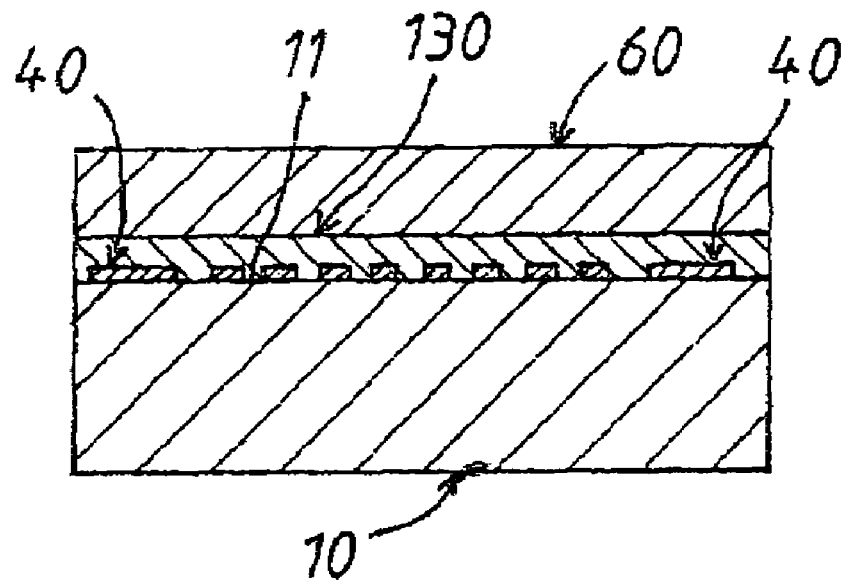
FIG. 10 is a cross-sectional view showing a Comparative Example 3 in the first embodiment.

Comparative Example 3 is prepared in a manner such that it has the constitution as shown in FIG. 10. Namely, the platinum resistor 20 and the evaporation-suppressing layer 40 are pattern-formed on the platinum resistor side portion on the surface 11 of the substrate 10 in the same manner as the temperature sensor according to the present first embodiment and, then, subjected to an aging treatment. Thereafter, AP5710-crystallized glass (trade name) available from Asahi Glass Co., Ltd. is screen-printed in a paste state on the platinum resistor side portion on the surface 11 of the substrate 10 in a manner that covers the platinum resistor 20 and the evaporation-suppressing layer 40, to thereby pattern-form a paste layer which becomes an adhesive layer 130. Thereafter, a covering lid layer 60 is laminated on the paste layer which becomes the adhesive layer 130 and, then, subjected to a firing treatment, to thereby prepare Comparative Example 3.

Figure 11:
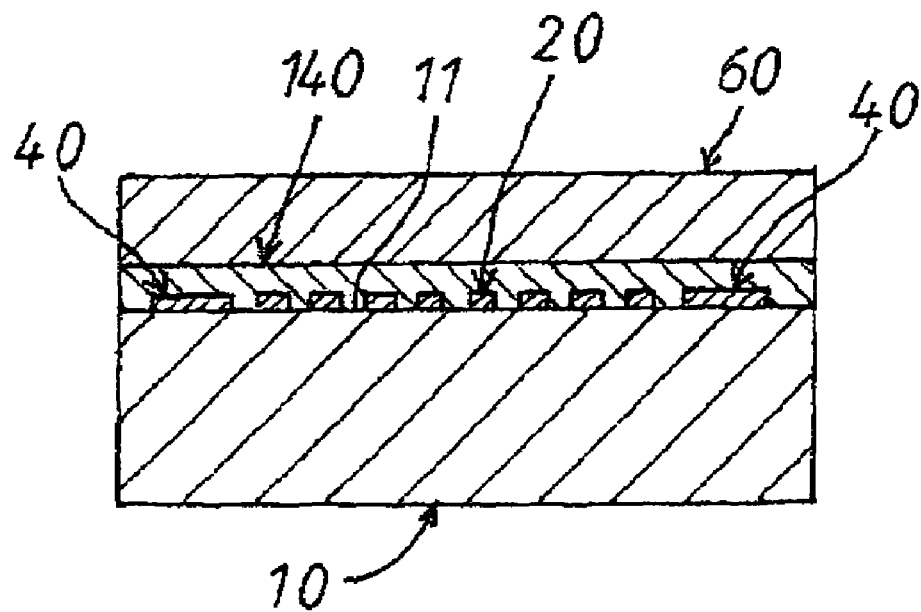
FIG. 11 is a cross-sectional view showing a Comparative Example 4 in the first embodiment.

Comparative Example 4 is prepared in a manner such that it has the constitution shown in FIG. 11. Namely, the platinum resistor 20 and the evaporation-suppressing layer 40 are pattern-formed on the platinum resistor side portion on the surface 11 of the substrate 10 in the same manner as the temperature sensor according to the present first embodiment and, then, subjected to an aging treatment. Thereafter, a material containing 96 (%) of silicon oxide glass ($SiO_2$ glass), available from Corning Inc., is screen-printed in a paste state on the platinum resistor side portion on the surface 11 of the substrate 10 in a manner that covers the platinum resistor 20 and the evaporation-suppressing layer 40, to thereby pattern-form a paste layer which becomes an adhesive layer 140. Thereafter, a covering lid layer 60 is laminated on the paste layer which becomes the adhesive layer 140 and, then, subjected to a firing treatment, to thereby prepare Comparative Example 4.

When the durability test was performed on each of the temperature sensors according to Comparative Examples 1 to 4 and the present first embodiment prepared in the manner described above, the results shown in Table 1 were obtained.

TABLE 1

| | Rate of change of resistance value between before and after durability test |
|---|---|
| Temperature sensor of present first embodiment | 0.30 |
| Comparative Example 1 | 1.20 |
| Comparative Example 2 | 3.30 |
| Comparative Example 3 | 3.70 |
| Comparative Example 4 | 4.30 |

In Table 1, the resistance value of the platinum resistor 20 in an ambient atmosphere prior to the durability test and the resistance value of the platinum resistor 20 in an atmosphere having a temperature of 24 (° C.) after the durability test are compared with each other and, then, a ratio of an increase of the resistance value of the platinum resistor 20 is shown in terms of a rate of change of the resistance value.

On this occasion, the rate of change of the resistance value is determined by the following formula (1), wherein Rf represents the resistance value of the platinum resistor 20 in an atmosphere having a temperature of 24 (° C.) after the durability test; and Rp represents the resistance value of the platinum resistor 20 in an ambient atmosphere prior to the durability test:

$$\text{Rate of change of resistance value} = \{(Rf-Rp)/Rp\} \times 100(\%) \quad (1)$$

As shown in Table 1, the change of the resistance value of the platinum resistor 20 of the temperature sensor according to the present first embodiment is 0.3 (%) and 1 (%) or less before and after the durability test. On the other hand, it is found that the resistance value of each of the platinum resistors 20 in Comparative Examples 1 to 4 is changed fairly largely before and after the durability test, compared with the change of the resistance value of the platinum resistor 20 of the temperature sensor according to the present first embodiment. Reasons for such a large change in the resistance value are described below.

When the temperature sensor according to the present first embodiment is compared with Comparative Example 1, since Comparative Example 1 does not have the evaporation-suppressing layer 40 of the temperature sensor of the present first embodiment, vaporization of the platinum resistor 20 of Comparative Example 1 takes place in a high temperature atmosphere. For this account, the rate of change of the resistance value of the platinum resistor 20 is fairly larger in Comparative Example 1 than the temperature sensor according to the present first embodiment.

Further, when the temperature sensor according to the present first embodiment is compared with Comparative Example 2, the constitution of the inside protective layer 110 and the outside protective layer 120 in Comparative Example 2 is, as shown in FIG. 9, different from the constitution of the adhesive layer 50 and the covering lid layer 60 in the present first embodiment. Still further, although the inside protective layer 110 and the adhesive layer 50 comprise the same forming material, the outside protective layer 120, which is different from the high-purity alumina material used as the forming material of the covering lid layer 60, is formed by AP5710-crystallized glass (trade name) available from Asahi Glass Co., Ltd.

On this occasion, at a high temperature, a portion of the crystallized glass is melted and, then, an electrochemical reaction occurs between the thus-melted glass component and the platinum resistor 20, to thereby deteriorate the platinum resistor 20. For this account, the change of the resistance value of the platinum resistor 20 is larger in Comparative Example 2 than in the temperature sensor according to the present first embodiment. This means that deterioration caused by the electrochemical reaction between the platinum resistor 20 and the glass component is favorably suppressed, compared with Comparative Example 2, by using the high-purity alumina material as the forming material of the covering lid layer 60.

Further, when the temperature sensor according to the present first embodiment is compared with Comparative Example 3, the cross-sectional structure as shown in FIG. 2 for the temperature sensor according to the present first embodiment is the same as that shown in FIG. 10 for Comparative Example 3. However, the forming material of adhesive layer 130 of Comparative Example 3 is not the high-purity alumina material, which is the forming material of the adhesive layer 50 of the temperature sensor according to the present first embodiment, and is instead AP5710-crystallized glass. For this account, the change of the resistance value of the platinum resistor 20 is fairly larger in Comparative Example 3 than the temperature sensor according to the present first embodiment. This means that the deterioration caused by the electrochemical reaction between the platinum resistor 20 and the glass component is favorably suppressed by using the high-purity alumina material as the forming material for the adhesive layer 50.

Even still further, when the temperature sensor according to the present first embodiment is compared with Comparative Example 4, the forming material of the adhesive layer 140 of Comparative Example 4 is not the high-purity alumina material, which is the forming material of the adhesive layer 50 of the temperature sensor according to the present first embodiment, and is instead a material containing silicon oxide glass. For this account, the change of the resistance value of the platinum resistor 20 is fairly larger in Comparative Example 4 than the temperature sensor according to the present first embodiment.

From these facts, it is found that the temperature sensor according to the present first embodiment, for which vaporization of the platinum resistor 20 and an electrochemical reaction with the glass component scarcely take place during the durability test, is extremely favorable in terms of high temperature durability compared with Comparative Examples 1 to 4.

Furthermore, with regard to the evaporation-suppressing layer 40 of the temperature sensor according to the present first embodiment, as well as the evaporation-suppressing layer (including the lead which performs the same act as the evaporation-suppressing layer) in each embodiment to be described below, when the temperature sensor is disposed in an atmosphere having a temperature of 700 (° C.) or more, the advantageous effects derived from the evaporation-suppressing layer are particularly remarkably realized.

Second Embodiment

Figure 12:
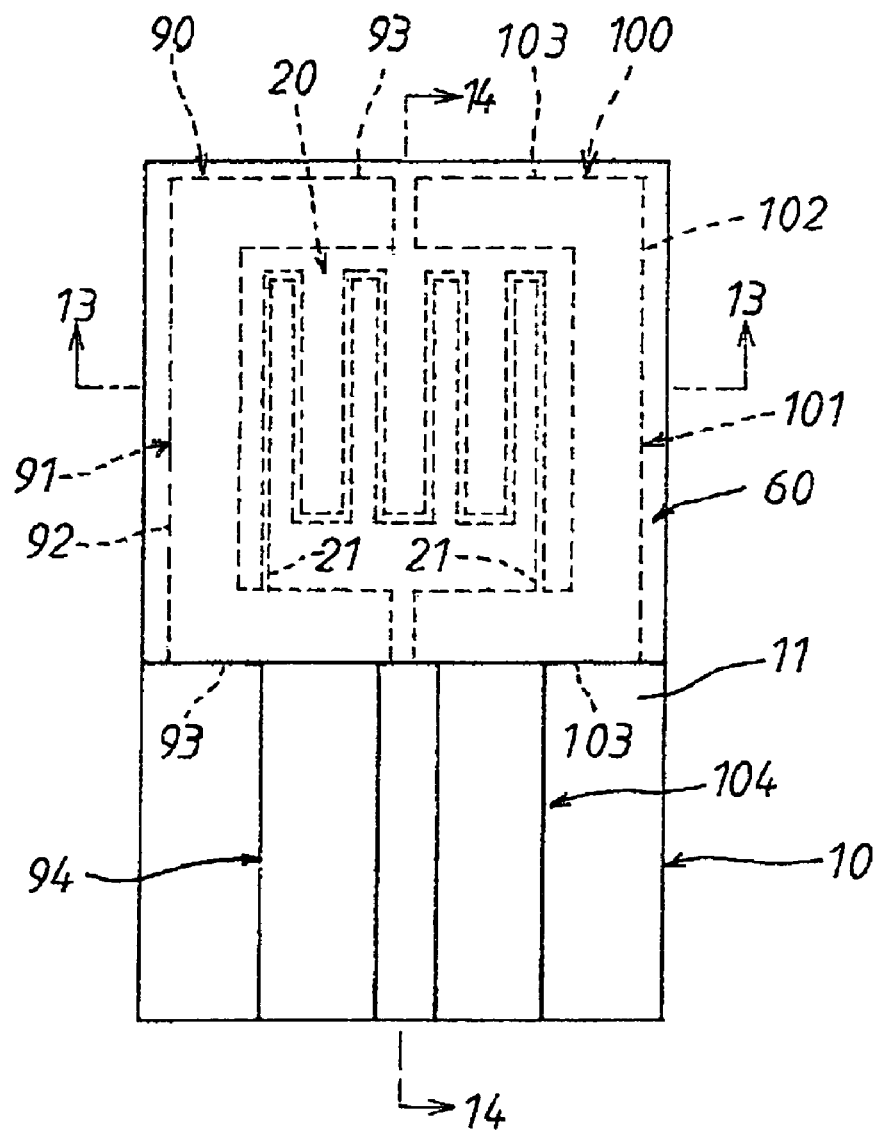
FIG. 12 is a plan view showing a second embodiment of a platinum resistor temperature sensor according to the present invention.
Figure 13:
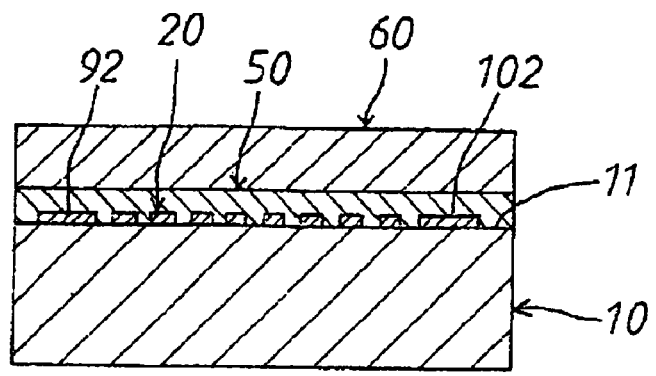
FIG. 13 is a cross-sectional view taken on line 13-13 in FIG. 12.
Figure 14:
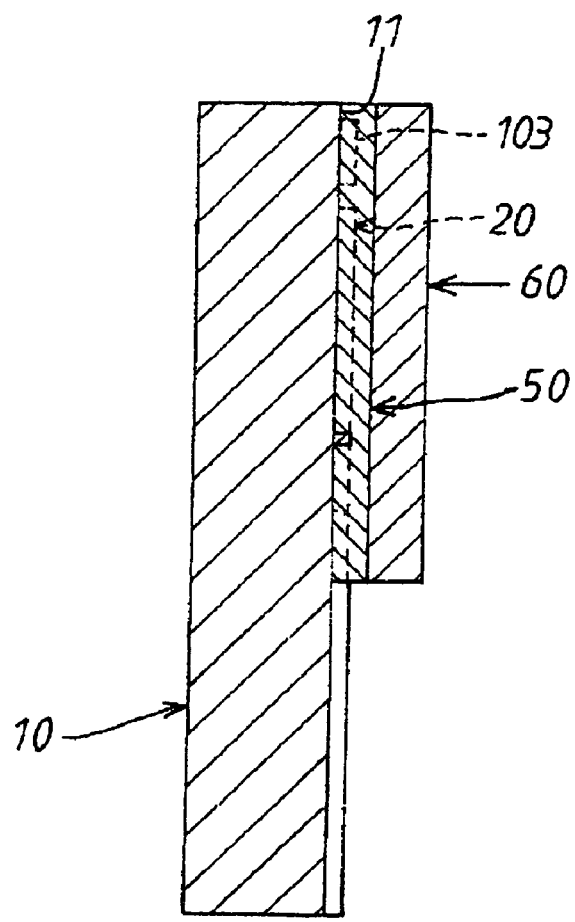
FIG. 14 is a cross-sectional view taken on line 14-14 in FIG. 12.
Figure 15:
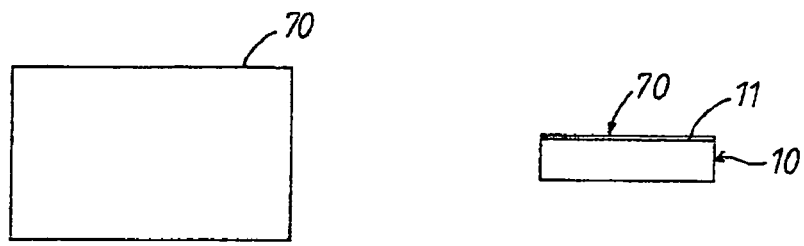
FIG. 15 is a diagram showing a process of forming a platinum film by sputtering in the production process of the second embodiment observed from a plane side and a side face side.

FIGS. 12 to 18 show a second embodiment of the temperature sensor according to the present invention. The second embodiment has a constitution in which, as shown in FIGS. 12 to 14, left-side and right-side both leads 90 and 100 are adopted in place of the left-side and right-side both leads 30 and the evaporation suppressing layer 40 in the first embodiment.

The left-side and right-side both leads 90 and 100 are, as shown in FIG. 12, formed by using platinum (Pt) on the surface 11 of the substrate 10 in a manner such that it has a constitution having left-right symmetry as shown in the figure, taking the center in a left-right direction shown in the figure of the surface 11 of the substrate 10 as a reference.

A left-side lead 90 comprises a lead portion 91 in a shape of a square deprived of one side and this lead portion 91 is formed on a left-side portion of an upper-side portion (the platinum resistor-side portion) shown in FIG. 12 on the surface 11 of the substrate 10 in a manner the encloses the left-side portion shown in the figure of the platinum resistor 20 from the left side in the shape of the square deprived of one side.

On this occasion, the lead portion 91 is, in a junction portion 92 thereof, situated in parallel in a meander direction of the platinum resistor 20 at a left side thereof and upper and lower both side arm portions 93 of the lead portion 91 are situated in parallel to each other in a manner sandwiches the left-side portion of the platinum resistor 20 (see FIG. 12). Further, a lower-side arm portion 93 is formed as a unity with the left-side connection end portion 21 of the platinum resistor 20.

Still further, the left-side lead 90 comprises a lead portion 94 in a linear shape and this lead portion 94 is formed at a center side on the low-side portion (the lead-side portion) on the surface 11 of the substrate 10 in a manner that extends downward in a linear shape from lower-side arm portion 93 of the lead portion 91.

On the other hand, a right-side lead 100 comprises a lead portion 101 in a shape of a square deprived of one side and this lead portion 101 is formed on a right-side portion of an upper-side portion (the platinum resistor-side portion) shown in FIG. 12 on the surface 11 of the substrate 10 in a manner that encloses the right-side portion shown in the figure of the platinum resistor 20 from the right side in the shape of the square deprived of one side.

On this occasion, the lead portion 101 is, in a junction portion 102 thereof, situated in parallel in a meander direction of the platinum resistor 20 at a right side thereof and upper and lower both side arm portions 103 of the lead portion 101 are situated in parallel to each other in a manner that sandwiches the right-side portion of the platinum resistor 20 (see FIG. 12). Further, lower-side arm portion 103 is formed in unity with the right-side connection end portion 21 of the platinum resistor 20. Still further, the upper and lower both side arm portions 103, as shown in FIG. 12, face the upper and lower both arm portions 93 via a narrow gap.

Even still further, the right-side lead 100 comprises a lead portion 104 in a linear shape and this lead portion 104 is formed at a center side on the low-side portion (the lead-side portion) on the surface 11 of the substrate 10 in a manner that extends downward in a linear shape from the lower-side arm portion 103 of the lead portion 101.

In the present second embodiment, the adhesive layer 50 as described in the present first embodiment is formed on the platinum resistor-side portion on the surface 11 of the substrate 10 in a manner that covers the platinum resistor 20 and the lead portions 91 and 101 in the shape of the square deprived of one side of the both leads 90 and 100. Further, the covering lid layer 60, as described in the first embodiment, is formed by laminating it on the adhesive layer 50 in the present second embodiment.

Next, a production method of the temperature sensor according to the present second embodiment constituted in the manner described above will be described with reference to FIGS. 15 to 18, wherein reference numerals not expressly mentioned below designate the same part of the invention as described above with respect to FIGS. 12 to 14. Firstly, in the same manner as in the first embodiment, the platinum film 70 is formed by using platinum over the entire face of the surface 11 of the substrate 10 by means of sputtering (see, a plain view shown at the left side and a side view shown at the right side in FIG. 15).

Figure 16:
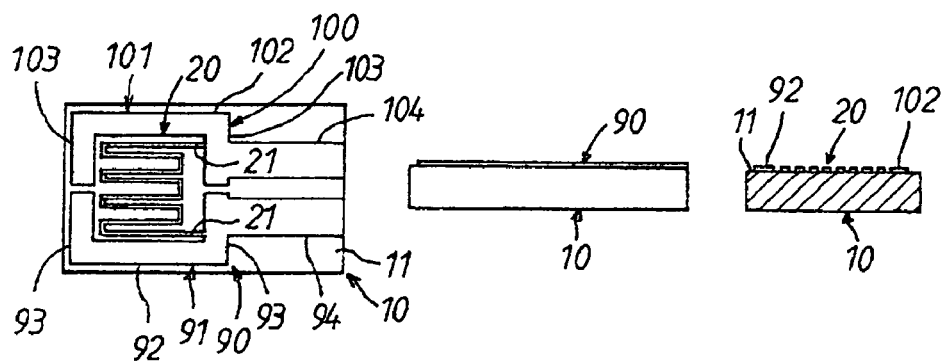
FIG. 16 is a diagram showing a process of patterning and formation of a platinum resistor and both leads in the production process of the second embodiment observed from a plane side, a side face side and as a cross-section.
Figure 17:
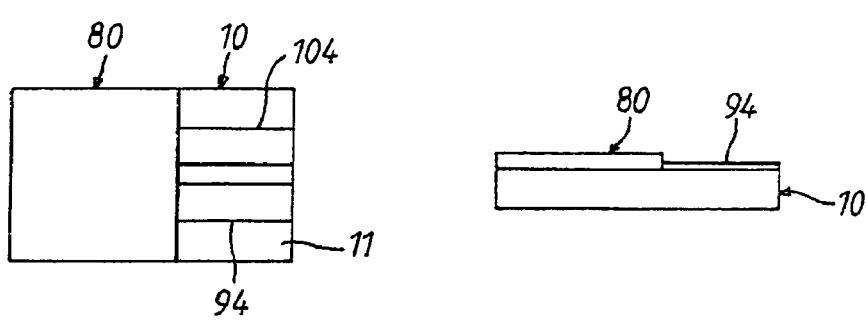
FIG. 17 is a diagram showing a process of forming a paste layer which becomes an adhesive layer in the production process of the second embodiment observed from a plane side and a side face side.
Figure 18:
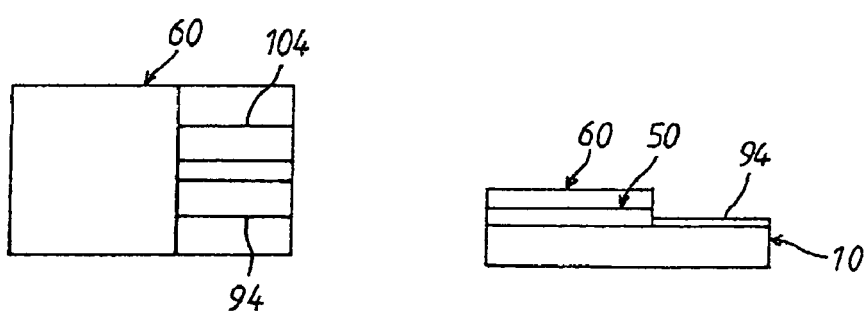
FIG. 18 is a diagram showing a process of laminating a covering lid layer in the production process of the second embodiment observed from a plane side and a side face side.

Thereafter, the platinum film 70 is subjected to a patterning treatment by photolithography processing and etching processing, to thereby form the platinum resistor 20, both leads 90 and 100 on the surface 11 of the substrate 10 in a thin film state (see, a plan view shown at the left side, a side view shown at the center and a cross-sectional view shown at the right side in FIG. 16 and, also, FIGS. 12 to 14).

After the platinum resistor 20 and both leads 90 and 100 are pattern-formed in the manner described above, high-purity alumina material is applied or screen-printed in a paste state on the left-side portion shown in the figure (the platinum resistor-side portion) via the platinum resistor 20 and respective lead portions 91 and 101 of both leads 90 and 100 in the same manner as the first embodiment. Next, the covering lid layer 60 is laminated on the paste layer 80 (see, a plan view shown at left side and a side view shown at the right side in FIG. 18).

A structure in which the covering lid layer 60 is laminated on the surface 11 of the substrate 10 via the paste layer 80, the platinum resistor 20 and both leads 90 and 100 is fired in an atmosphere of a predetermined high temperature (for example, 1150 (□C) to 1300 (□C)). By such firing, a production of the temperature sensor according to the present second embodiment is terminated.

In the temperature sensor according to the present second embodiment produced in the manner described above, the covering lid layer 60 is firmly adhered on the platinum resistor-side portion on the surface 11 of the substrate 10 by adhesion action of the paste layer 80 which becomes the adhesive layer 50 in same manner as in the first embodiment.

On this occasion, the platinum resistor 20 and both lead portions 91 and 101 in the shape of a square deprived of one side are held on the surface 11 of the substrate 10 in a state of being covered by the adhesive layer 50. In such state as described above, the left-side portion of the platinum resistor 20 is enclosed by the lead portion in the shape of a square deprived of one side from the left-side thereof, while the right-side portion of the platinum resistor 20 is enclosed by the lead portion 101 in the shape of a square deprived of one side from the right side thereof.

Therefore, in a process of firing in a high temperature atmosphere as described above, a high-temperature oxidative gas in the atmosphere passes through the adhesive layer 50, an interface between the adhesive layer 50 and the substrate 10 or an interface between the adhesive layer 50 and the covering lid layer 60 and reaches the lead portions 91 and 100 and the platinum resistor 20. On this occasion, since both lead portions 91 and 101, each in the shape of a square deprived of one side, are formed by using platinum as described above, both lead portions 91 and 101, each in the shape of a square deprived of one side, are evaporated by the high-temperature oxidative gas. For this account, the platinum vapor pressure generated by the evaporation of both lead portions, each in the shape of a square deprived of one side, becomes high in the vicinity of the platinum resistor 20, in the same manner as in the case of the evaporation of the evaporation-suppressing layer 40 as described in the first embodiment.

Further, since the platinum resistor 20 is formed by using platinum in the same manner as leads 90 and 100, the platinum resistor 20 also tends to be evaporated by the high-temperature oxidative gas in the atmosphere. However, as described above, since the platinum vapor pressure generated by the evaporation of both lead portions 91 and 101, each in the shape of a square deprived of one side, is high in the vicinity of the platinum resistor 20, the platinum vapor pressure generated by the evaporation of both lead portions 91 and 101 favorably suppresses the evaporation of the platinum resistor 20.

Therefore, even when the high-temperature oxidative gas in the atmosphere reaches the platinum resistor 20, the platinum resistor 20 is scarcely evaporated. As a result, in the present second embodiment, in the production process of the temperature sensor, even when such firing treatment as described above is performed, the platinum resistor 20 retains its external shape from just before firing and maintains its normal resistance value as the temperature sensor.

Further, in the present second embodiment, in addition to their role as leads, as described above, both lead portions 91 and 101, each in the shape of a square deprived of one side, perform the same role as the evaporation-suppressing layer 40 described in the first embodiment, to thereby favorably suppress the evaporation of the platinum resistor 20. Therefore, in the present second embodiment, it is not necessary to use the evaporation-suppressing layer 40.

Next, an example of temperature detection by using the temperature sensor according to the second embodiment as produced in the manner described above will be described. The temperature sensor is disposed in an exhaust pipe of an internal combustion engine mounted on an automobile in the same manner as in the first embodiment. In such a state as described above, when the automobile is allowed to run, the internal combustion engine exhausts the exhaust gas in the exhaust pipe. Since the temperature of this exhaust gas is high, the temperature sensor is forced to be exposed to an atmosphere of the high-temperature exhaust gas.

In such a state as described above, the high-temperature oxidative gas in the exhaust gas atmosphere, as in substantially the same manner as described above, passes through the adhesive layer 50, the interface between the adhesive layer 50 and the substrate 10 or the interface between the adhesive layer 50 and the covering lid layer 60 and reaches lead portions 91 and 101, each in the shape of a square deprived of one side, and the platinum resistor 20. On this occasion, as described above, since lead portions 91 and 101, each in the shape of a square deprived of one side, are formed by using platinum, lead portions 91 and 101 are evaporated by the high-temperature oxidative gas in the exhaust gas atmosphere and the platinum vapor pressure generated by the evaporation of both lead portions 91 and 101 is high in the vicinity of the platinum resistor 20.

Further, since the platinum resistor 20, as described in the first embodiment, is formed by using platinum in the same manner as the evaporation-suppressing layer 40 of the first embodiment, the platinum resistor 20 also tends to be evaporated by the high-temperature oxidative gas in the exhaust gas atmosphere. However, as described above, since the platinum vapor pressure by the evaporation of both lead portions 91 and 101, each in the shape of a square deprived of one side, becomes high in the vicinity of the platinum resistor 20, the platinum vapor pressure generated by the evaporation of both lead portions 91 and 101, each in the shape of a square deprived of one side, favorably suppresses the evaporation of the platinum resistor 20. Therefore, even when the high-temperature oxidative gas in the exhaust gas atmosphere reaches the platinum resistor 20, the platinum resistor 20 is scarcely evaporated.

Accordingly, even in the second embodiment according to the present invention, in the same manner as described in the first embodiment, in the detection process of the temperature of the exhaust gas by the temperature sensor, the platinum resistor 20 retains its external shape from just immediately after the production thereof, does not become thin and maintains its normal resistance value. As a result, it goes without saying that the temperature sensor in the second embodiment, in the same manner as in the first embodiment, also maintains a favorable high-temperature durability for a long period of time. In addition, the temperature sensor in the second embodiment can always favorably detect the high temperature of the exhaust gas of the internal combustion engine with good precision. Other effects than those described above are the same as in the first embodiment.

Third Embodiment

Figure 19:
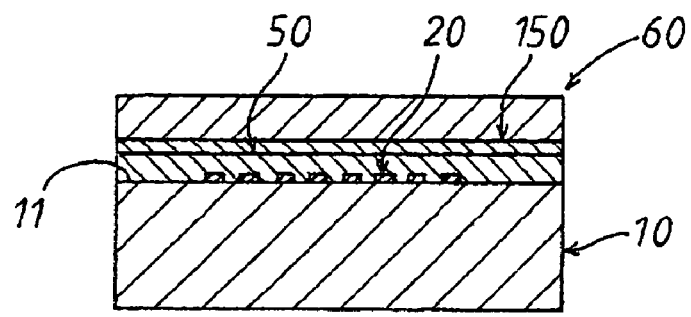
FIG. 19 is a transverse cross-sectional view showing a third embodiment according to the present invention.
Figure 20:
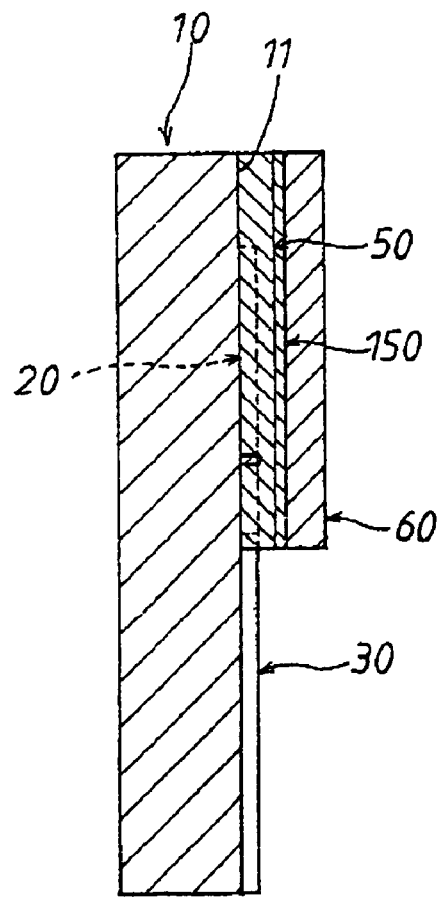
FIG. 20 is a vertical cross-sectional view showing the third embodiment.

FIGS. 19 and 20 show a third embodiment of a platinum resistor temperature sensor according to the present invention. The third embodiment has a constitution in which an evaporation-suppressing layer 150 is adopted in place of the evaporation-suppressing layer 40 (see FIG. 2) in the platinum resistor temperature sensor as described in the first embodiment.

The evaporation-suppressing layer 150 is, as shown in FIGS. 19 and 20, wherein reference numerals not expressly mentioned below designate the same parts of the invention as described above with respect to FIGS. 1 to 18, inserted between the adhesive layer 50 and the covering lid layer 60. On this occasion, the evaporation-suppressing layer 150 is formed in a laminate state by the same material as the evaporation-suppressing layer 40 over the entire surface of the adhesive layer 50. Further, the covering lid layer 60 is provided in a laminate state over the entire surface of the evaporation-suppressing layer 150. Other constitutions than those described above are the same as in the first embodiment.

Still further, in the production of the temperature sensor according to the present third embodiment, the evaporation-suppressing layer 150 is formed on the covering lid layer 60 by using platinum by means of sputtering and, then, the evaporation-suppressing layer 150 is laminated on the paste layer 80 such that the face opposite to the covering lid layer 60 of the evaporation-suppressing layer 150 is situated at the side of the paste layer 80 (see FIG. 6) and, then, fired in the firing atmosphere. Other production processes than that as described above are the same as in the first embodiment.

In the present third embodiment constituted as above, as described above, the evaporation-suppressing layer 150 is inserted between the adhesive layer 50 and the covering lid layer 60 over the entire interface between the adhesive layer 50 and the covering lid layer 60.

Therefore, in such a firing process as the firing atmosphere described above, the high-temperature oxidative gas in the firing atmosphere comes in contact with an outer circumferential portion of the evaporation-suppressing layer 150 comprising platinum. For this account, the evaporation-suppressing layer 150 is evaporated by the high-temperature oxidative gas in the firing atmosphere. Along with such evaporation, the platinum vapor pressure generated by the evaporation of the evaporation-suppressing layer 150 passes through the adhesive layer 50 and becomes high in the vicinity of the platinum resistor 20. On this occasion, since the evaporation-suppressing layer 150 is formed over the entire surface of the adhesive layer 50 as described above, the platinum vapor pressure generated from the evaporation-suppressing layer 150 acts to cover the platinum resistor 20 as a whole.

Further, in the firing process, the high-temperature oxidative gas in the firing atmosphere passes from the outer circumferential portion of the adhesive layer 50 to an interface between the adhesive layer 50 and the substrate 10, which has a surface 11, or an interface between the adhesive layer 50 and the evaporation-suppressing layer 150 and, then, reaches the platinum resistor 20. Therefore, the platinum resistor 20 tends to be evaporated by the high-temperature oxidative gas. However, as described above, since the platinum vapor pressure generated from the evaporation suppressing layer 150 is maintained high while acting as covering the platinum resistor 20 as a whole, the platinum vapor pressure favorably suppresses the evaporation of the platinum resistor 20. As a result, even when the high-temperature oxidative gas in the firing atmosphere reaches the platinum resistor 20, the platinum resistor 20 is scarcely evaporated.

Further, in a case in which the temperature sensor according to the third embodiment is used for detecting the temperature in the exhaust pipe of the internal combustion engine in the manner as described in the first embodiment, even though the high-temperature oxidative gas contained in the high-temperature atmosphere of the exhaust gas in the exhaust pipe acts on the temperature sensor, the evaporation of the platinum resistor 20 can favorably be suppressed in the same manner as in the suppression of the evaporation of the platinum resistor 20 against the high-temperature oxidative gas in the firing atmosphere. Other effects than that described above are same as in the first embodiment.

Fourth Embodiment

Figure 21:
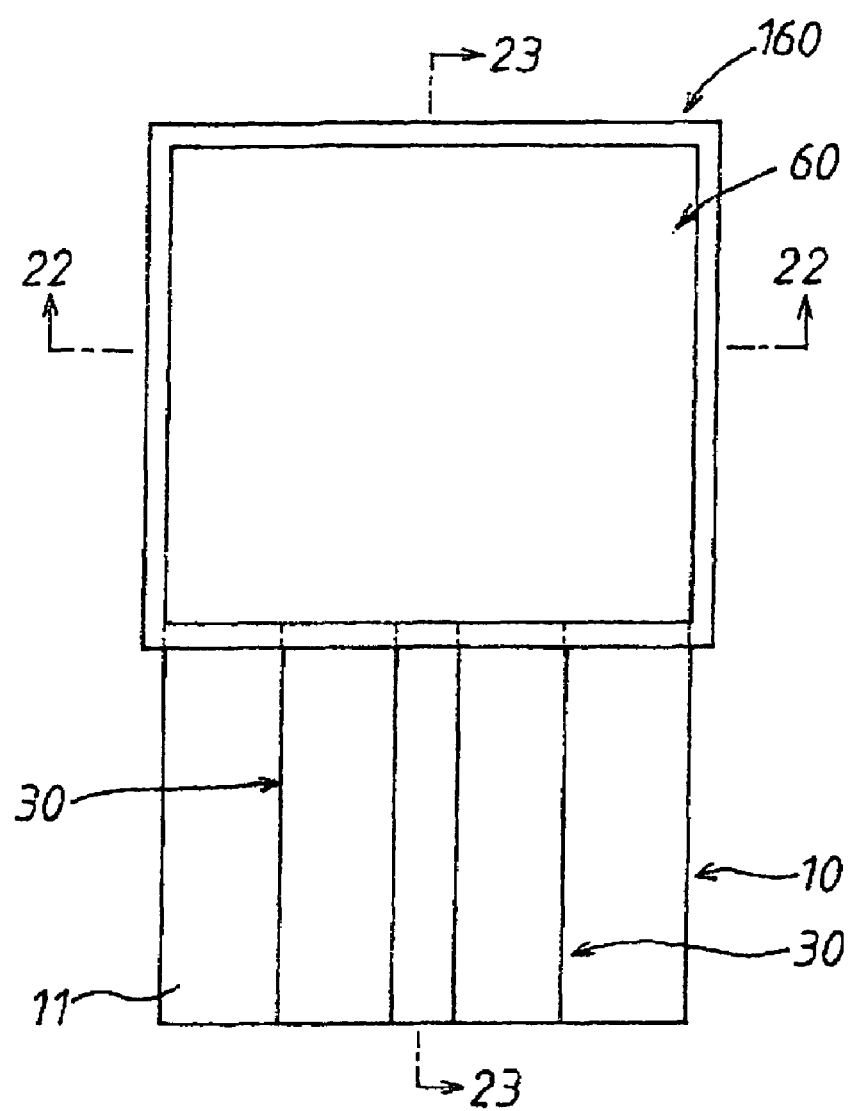
FIG. 21 is a plan view showing a fourth embodiment according to the present invention.
Figure 22:
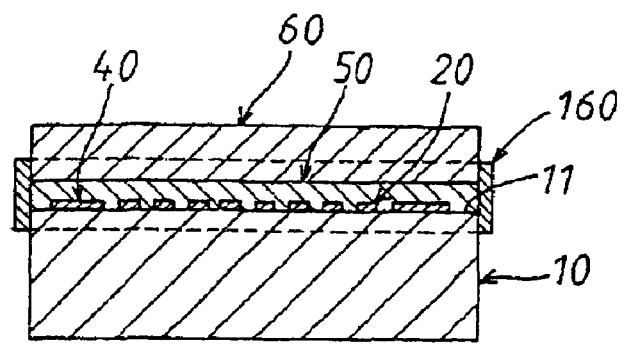
FIG. 22 is a cross-sectional view taken on line 22-22 in FIG. 21.
Figure 23:
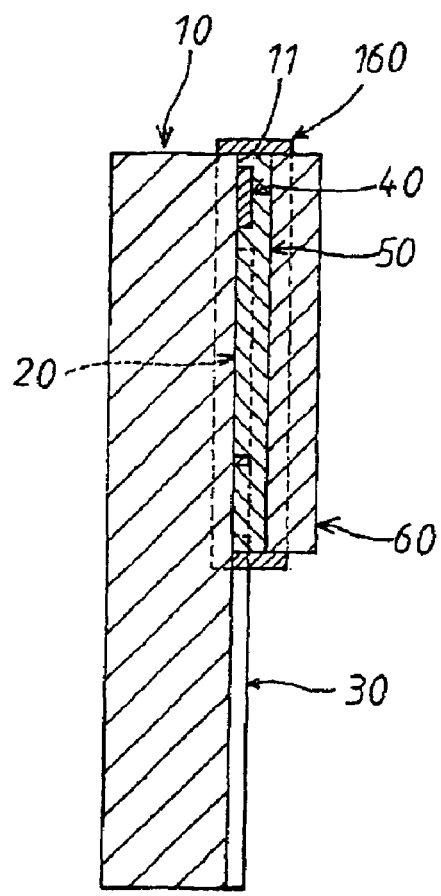
FIG. 23 is a cross-sectional view taken on line 23-23 in FIG. 21.

FIGS. 21 to 23, wherein reference numerals not expressly mentioned below designate the same parts of the invention as described above with respect to FIGS. 1-20, show a fourth embodiment according to the present invention. The fourth embodiment has a constitution in which a sealing layer 160 in an approximately circular shape comprising a glass material is additionally adopted in the temperature sensor (see FIGS. 2 and 3) as described in the first embodiment.

The sealing layer 160 is, as shown in FIGS. 21 to 23, formed in a manner that covers an outer circumferential portion at the side in the vicinity of the adhesive layer 50 between an outer circumferential face of the adhesive layer 50 and an outer circumference face of the covering lid layer 60 and, further, the outer circumferential face portion in the shape of a square deprived of one side at the side in the vicinity of the adhesive layer 50 in the outer circumferential surface of the substrate 10 (corresponding to the outer circumferential portion in the shape of a square deprived of one side in the outer circumferential surface of the adhesive layer 50 excluding the outer circumferential face portion at the side of both leads 30). Other constitutions than that described above are the same as in the first embodiment.

In the fourth embodiment constituted as above, as described above, the sealing layer 160 is formed extending from the outer face portion at the side in the vicinity of the adhesive layer 50 of the covering lid layer 60 to the outer face portion in the shape of a square deprived of one side at the side in the vicinity of the adhesive layer 50 of the substrate 10 via the outer circumferential face of the adhesive layer 50 in a manner that covers the outer circumferential face of the adhesive layer 50.

Therefore, an interface between the adhesive layer 50 and the substrate 10 or the covering lid layer 60 is sealed from the high-temperature oxidative gas in the firing atmosphere or the high-temperature oxidative gas in an atmosphere in the exhaust pipe of the internal combustion engine by the sealing layer 160. As a result, since the platinum resistor 20 is favorably blocked from the oxidative gas, together with an action of the platinum vapor pressure of the evaporation-suppressing layer 40, the evaporation of the platinum resistor 20 by the influence of the oxidative gas can more favorably be suppressed. Other effects than those described above are same as in the first embodiment.

Fifth Embodiment

Figure 24:
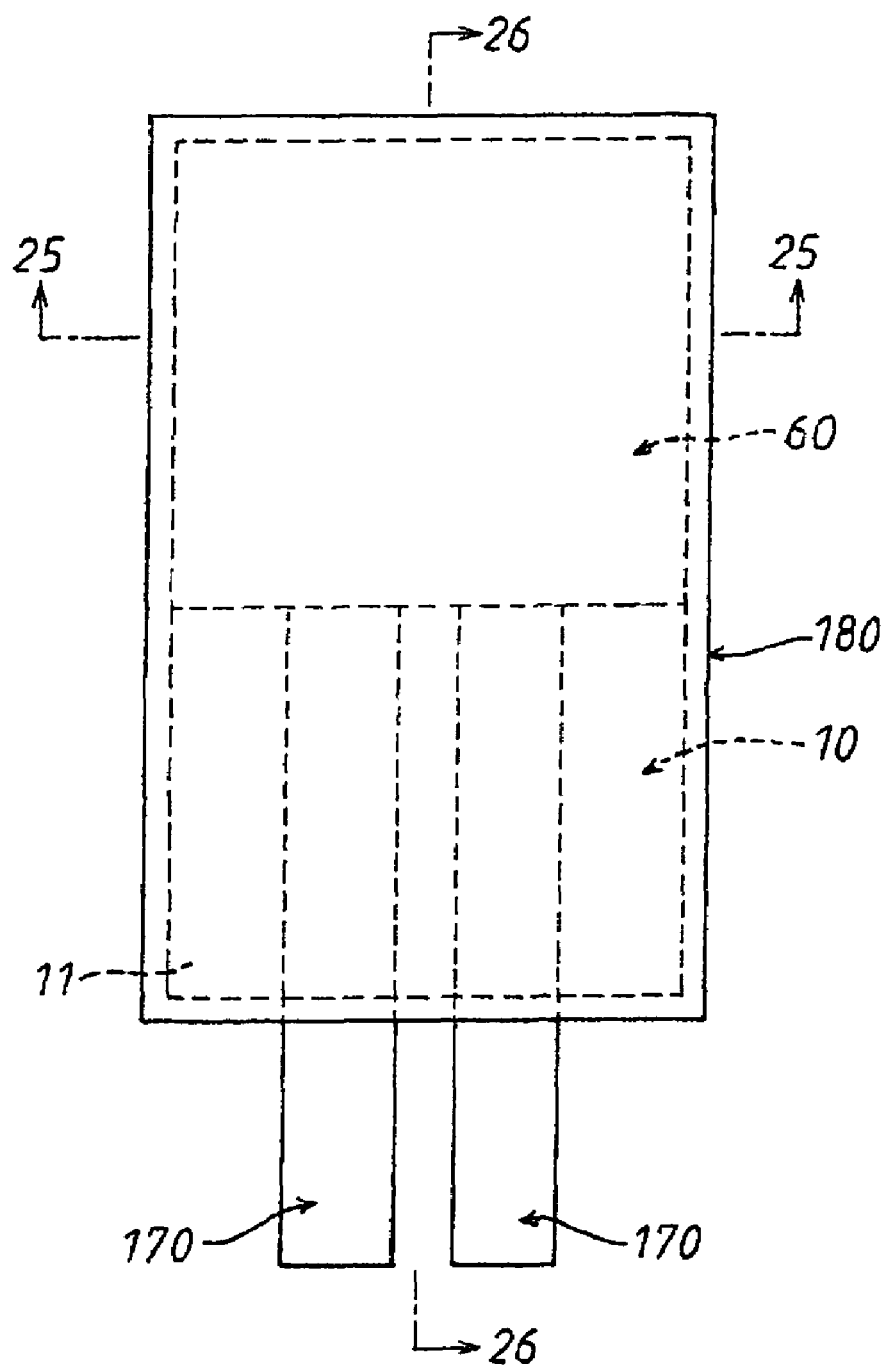
FIG. 24 is a plan view showing a fifth embodiment according to the present invention.
Figure 25:
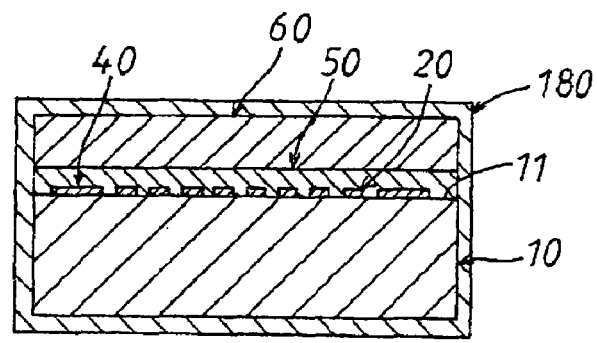
FIG. 25 is a cross-sectional view taken on line 25-25 in FIG. 24.
Figure 26:
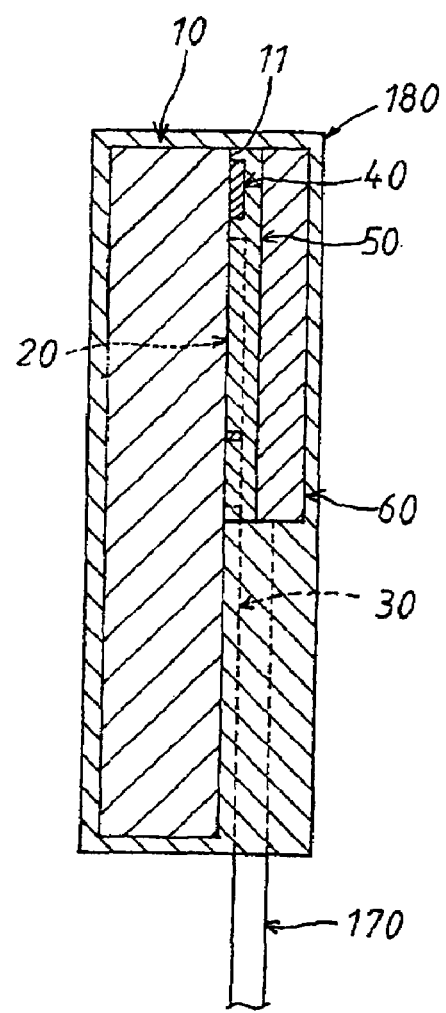
FIG. 26 is a cross-sectional view taken on line 26-26 in FIG. 24.

FIGS. 24 to 26, wherein reference numerals not expressly mentioned below designate the same parts of the invention as described above with respect to FIGS. 1 to 23, show a fifth embodiment according to the present invention. The fifth embodiment has a constitution in which both leads 170 and a sealing layer 180 are newly added in the temperature sensor (see FIGS. 2 and 3) as described in the first embodiment.

Both leads 170 are provided for the purpose of connecting both leads 30 to an external circuit. Both leads 170 are, as shown in FIGS. 24 and 26, disposed extending from both leads 30 and extend outward from both leads 30 via the sealing layer 180.

The sealing layer 180 is, as shown in FIGS. 24 to 26, formed by using a glass material in a manner that encloses the substrate 10, the adhesive layer 50, the covering lid layer 60 and both lead portions extending from both leads 30 between both leads 30 and both leads 170. Other constitutions than those described above are the same as in the first embodiment.

In the fifth embodiment constituted in the manner as described above, since the sealing layer 180 is formed as described above, an interface between the adhesive layer 50 and the substrate 10 or the covering lid layer 60 is sealed by the sealing layer 180 from the high-temperature oxidative gas in the firing atmosphere or the high-temperature in the exhaust pipe of the internal combustion engine. For this account, since the platinum resistor 20 is more favorably blocked from the oxidative gas, in the same manner as described in the fourth embodiment and together with the action of the platinum vapor pressure of the evaporation-suppressing layer 40, the evaporation of the platinum resistor 20 generated by the influence of the oxidative gas can more favorably be suppressed.

Sixth Embodiment

Figure 27:
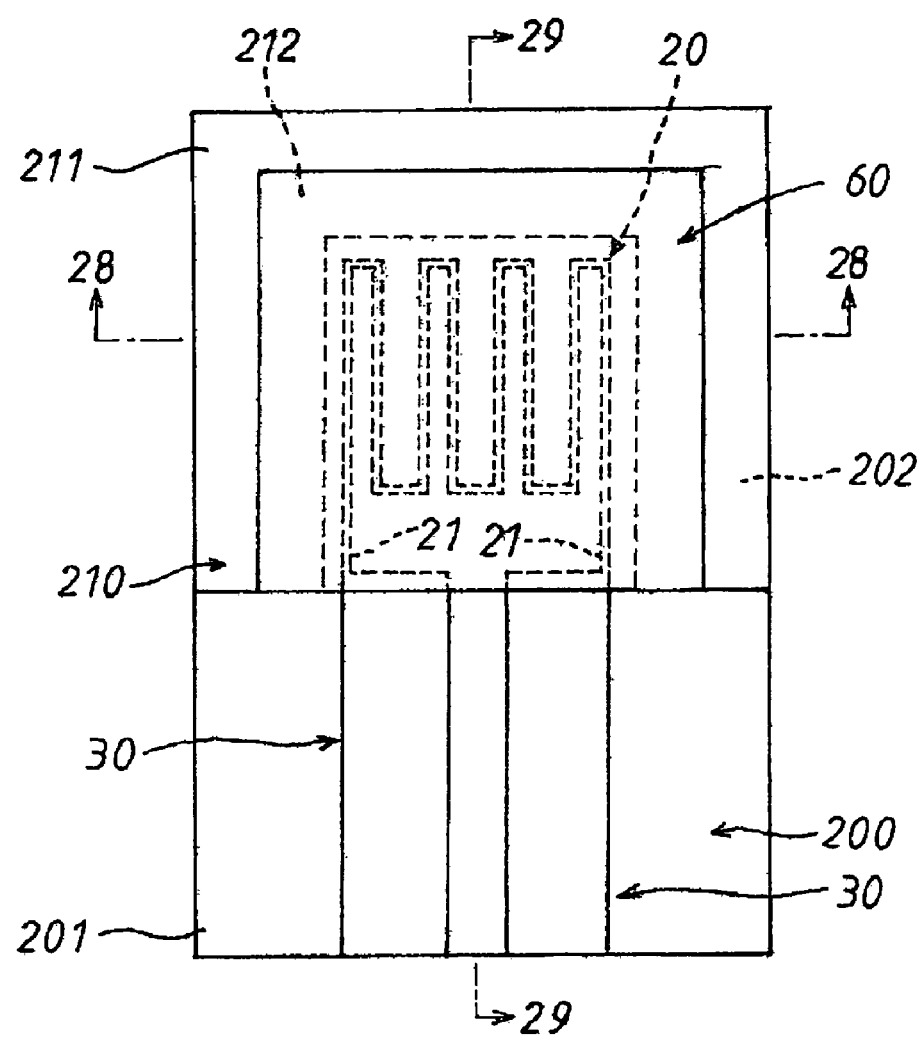
FIG. 27 is a plan view showing a sixth embodiment of a temperature sensor according to the present invention.
Figure 28:
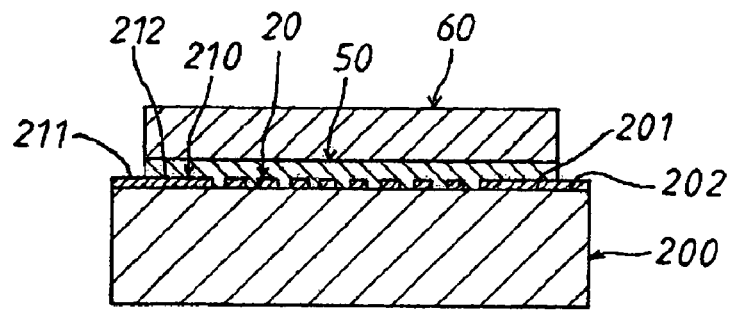
FIG. 28 is a cross-sectional view taken on line 28-28 in FIG. 27.
Figure 29:
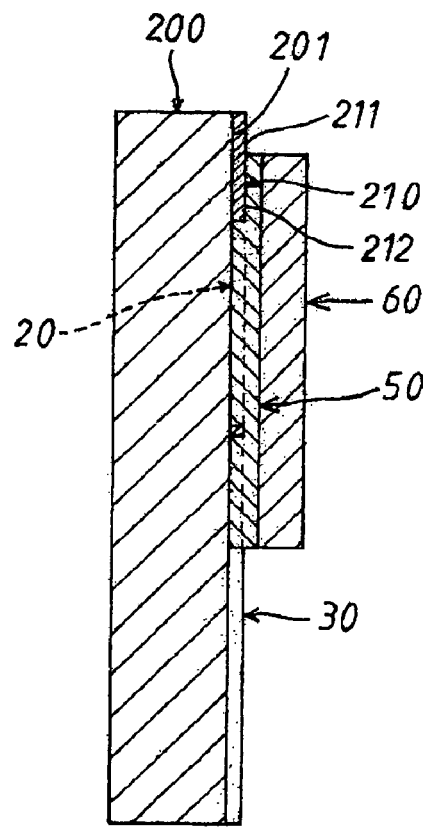
FIG. 29 is a cross-sectional view taken on line 29-29 in FIG. 27.

FIGS. 27 to 29, wherein reference numerals not expressly mentioned below designate the same parts of the invention as described above with respect to FIGS. 1 to 26, show a sixth embodiment according to the present invention. A temperature sensor in the sixth embodiment has a constitution in which a substrate 200 and an evaporation-suppressing layer 210 are adopted in place of the substrate 10 and the evaporation-suppressing layer 40 in the temperature sensor as described in the first embodiment.

The substrate 200 is formed by using the same forming material as that of the substrate 10 as described in the first embodiment, and the substrate 200, in a left-right direction shown in FIG. 27, is widely formed in a manner that extends from the substrate 10 (in other words, the adhesive layer 50 and the covering lid layer 60 as described in the first embodiment). Further, the substrate 200 is formed in a manner that extends upward higher than the adhesive layer 50 and the covering lid layer 60 in an upper end portion thereof shown in FIG. 27.

By taking such constitution as described above, a surface 201 of the substrate 200 extends to an outer circumferential side of the adhesive layer 50 and the covering lid layer 60 in the shape of a square deprived of one side in a left and right side and an upper side shown in FIG. 27. Further, a portion which extends in the shape of a square deprived of one side as described above on the surface 201 of the substrate 200 is hereinafter referred to also as "surface portion extending in the shape of a square deprived of one side 202".

The evaporation-suppressing layer 210 comprises platinum (Pt) in the same manner as in the evaporation-suppressing layer 40 as described in the first embodiment. The evaporation-suppressing layer 210 is, as is known from FIGS. 27 to 29, formed in the shape of a square deprived of one side along the surface 201 of the substrate 200 in a manner that encloses the circumference of the platinum resistor 20 as described in the first embodiment from a side of the left-side connection end portion 21 to a side of the right-side connection end portion 21.

On this occasion, the evaporation-suppressing layer 210, being different from the evaporation-suppressing layer 40 as described in the first embodiment, is formed on the surface 201 of the substrate 200 from the circumference of the platinum resistor 20 to the surface portion extending in the shape of a square deprived of one side 202. Hereinafter, a corresponding portion in the shape of a square deprived of one side against the surface portion extending in the shape of a square deprived of one side 202 in the evaporation suppressing layer 210 and the portion in the shape of a square deprived of one side exclusive of the corresponding portion are referred to also as "outside suppressing layer portion 211" and "inside suppressing layer portion 212", respectively.

Further, in the sixth embodiment, the adhesive layer as described in the first embodiment is, as shown in FIGS. 27 to 29, adhere-formed on an upper-side portion shown in FIG. 27 in the surface 201 of the substrate 200 in a manner that covers the platinum resistor 20 and the inside suppressing layer portion 212 of the evaporation-suppressing layer 210. Other constitutions than those as described above are the same as in the first embodiment.

A production method of the temperature sensor according to the present sixth embodiment constituted in the manner described above will be described. In substantially the same manner as in the first embodiment, the platinum resistor 20, both leads 30 and the evaporation-suppressing layer 210 are formed on the surface 201 of the substrate 200 in a thin film state by performing a patterning treatment, so as to have the above-described constitution. Further, the substrate 200 is formed by using high-purity alumina material so as to have a dense structure in the same manner as in the substrate 10 as described in the first embodiment.

Thereafter, the high-purity alumina material is screen-printed in a paste state on the upper-side portion shown in FIG. 27 on the surface 201 of the substrate 200 via the platinum resistor 20 and the inside suppressing layer 212 of the evaporation-suppressing layer 210, to thereby form a paste layer which comes to be the adhesive layer 50. Next, the covering lid layer 60 is laminated on the paste layer.

A structure in which the covering lid layer 60 is laminated on the surface 201 of the substrate 200 via the paste layer, the platinum resistor 20 and the inside suppressing layer portion 212 of the evaporation-suppressing layer 210 is fired in the firing atmosphere in the same manner as described in the first embodiment. By performing such firing, a production of the temperature sensor according to the sixth embodiment is terminated.

In the production process as described above, prior to the formation of the adhesive layer 50, the substrate 200 is formed more widely than the adhesive layer 50 in a manner that allows the outside suppressing layer portion 211 of the evaporation-suppressing layer 210 to be exposed in the outside of the adhesive layer 50. Therefore, when the adhesive layer 50 is formed on the surface 201 of the substrate 200 via the inside suppressing layer portion 212 of the evaporation-suppressing layer 210 and the platinum resistor 20, it becomes easy to form the adhesive layer 50.

Further, the evaporation-suppressing layer 210 has a larger volume than that of the evaporation-suppressing layer 40 as described in the first embodiment. Accordingly, the platinum vapor pressure to be generated by the evaporation-suppressing layer 210 due to the high-temperature oxidative gas becomes higher than the evaporation suppressing layer 40. As a result, the evaporation of the platinum resistor 20 is more favorably suppressed. Other effects are the same as in the first embodiment.

Now, in order to evaluate the high-temperature durability of the temperature sensor according to the present sixth embodiment, two Comparative Examples (hereinafter, referred to also as "Comparative Example 5" and "Comparative Example 6") were prepared and durability tests of temperature sensors of respective Comparative Examples 5 and 6 and the present sixth embodiment were conducted.

For the durability test, a circuit in which devices of the temperature sensors of the Comparative Examples 5 and 6 and the present sixth embodiment are individually and by turns connected in series with a direct current power supply of a direct current voltage of 5 (V) and a fixed resistor was prepared. In the present sixth embodiment, based on the durability test as described in the first embodiment, the direct current voltage of the direct current power supply is applied to any one of the devices of the temperature sensors of the Comparative Examples 5 and 6 and the present sixth embodiment via the fixed resistor allowing an electric current to flow therethrough, to thereby run the durability test. On this occasion, Comparative Examples 5 and 6 have respective constitutions as described below.

As for Comparative Example 5, Comparative Example 1 (see FIG. 8) as described in the first embodiment was used; and as for Comparative Example 6, the temperature sensor (see FIGS. 1 to 3) as described in the first embodiment was used.

Then, when the durability tests of the present sixth embodiment were conducted, the results as shown in Table 2 were obtained.

TABLE 2

|  | Rate of change of resistance value between before and after durability test |
|---|---|
| Temperature sensor of present sixth embodiment | 0.1 |
| Comparative Example 5 | 1.2 |
| Comparative Example 6 | 0.3 |

From Table 2, it is found that the high temperature durability of Comparative Example 6, namely, the temperature sensor as described in the first embodiment has been improved to a great extent compared with Comparative Example 5; however, the high temperature durability of the temperature sensor according to the present sixth embodiment has been more improved than Comparative Example 6.

Seventh Embodiment

Figure 30:
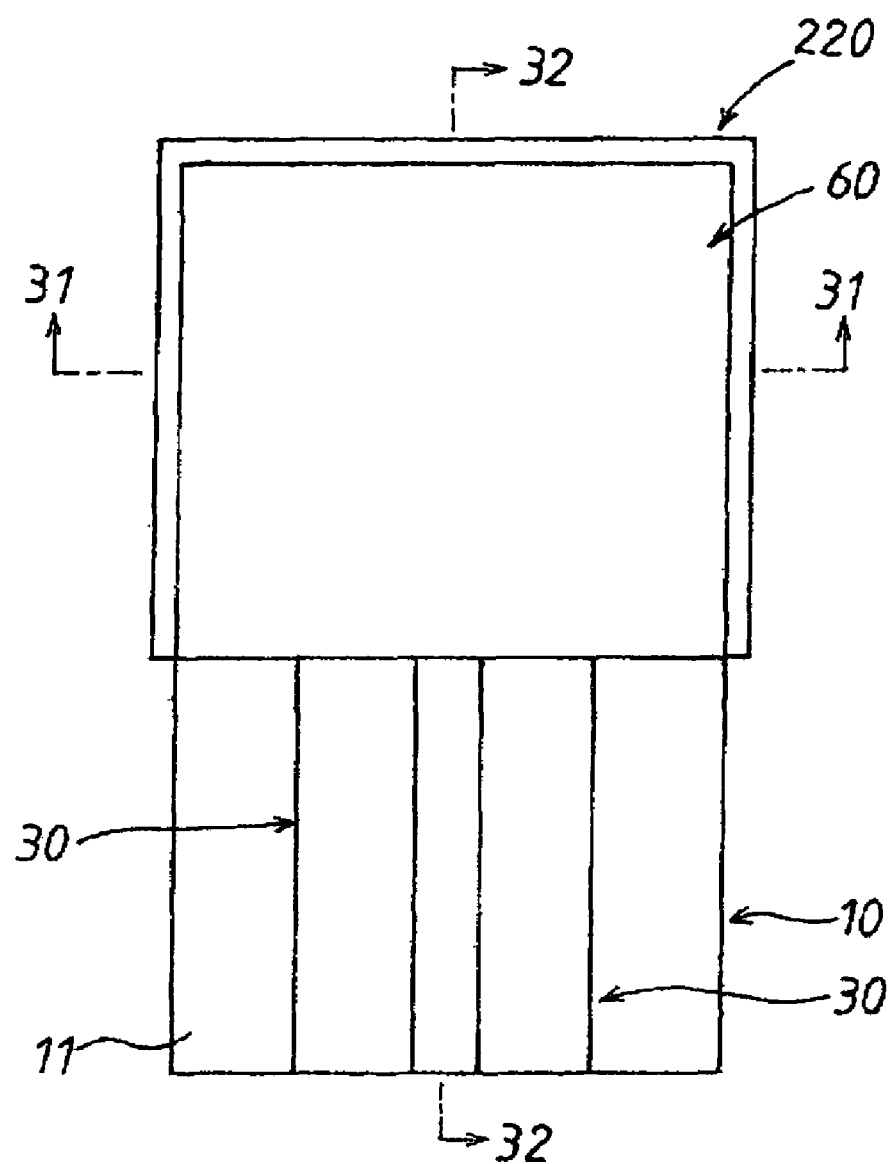
FIG. 30 is a plan view showing a seventh embodiment of a temperature sensor according to the present invention.
Figure 31:
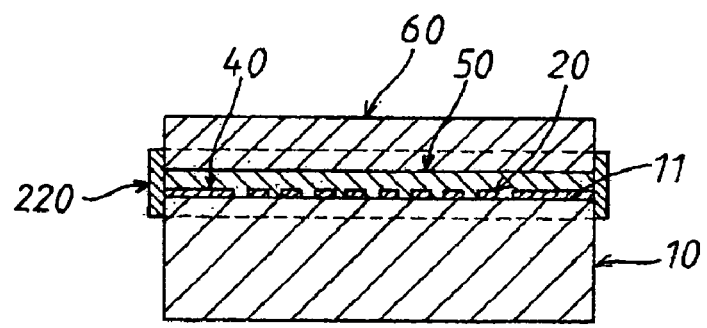
FIG. 31 is a cross-sectional view taken on line 31-31 in FIG. 30.
Figure 32:
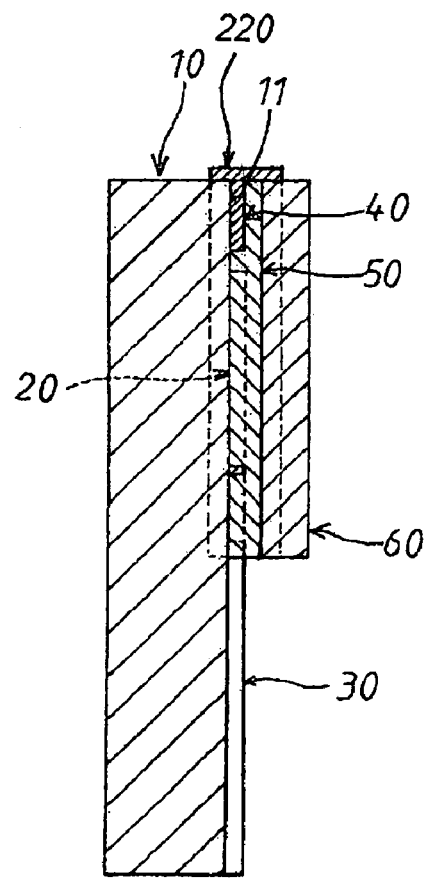
FIG. 32 is a cross-sectional view taken on line 32-32 in FIG. 30.

FIGS. 30 to 32, wherein reference numerals not expressly mentioned below designate the same parts of the invention as described above with respect to any of the previous Figures, show a seventh embodiment of a temperature sensor according to the present invention. In the seventh embodiment, the substrate 10, the adhesive layer 50 and the covering lid layer 60 as described in the first embodiment are each formed in a small enough size in a manner that allows a left-side face, a right-side face and an upper-side face (see FIGS. 31 and 32) of each of them to correspond to outer faces of a left side, a right side and an upper side of the evaporation suppressing-layer 40, respectively.

Further, in the present seventh embodiment, the evaporation-suppressing layer 220 in a strip shape is, as shown in FIGS. 30 to 32, formed in a manner that encloses an outer circumferential face portion in the shape of a square deprived of one side excluding a side of both leads 30 of the outer circumferential portion of the adhesive layer 50. On this occasion, the evaporation-suppressing layer 220 is formed in a manner that also encloses not only the outer circumferential face portion in the shape of a square deprived of one side of the adhesive layer 50, but also the substrate 10 and each outer circumferential face portion (see FIGS. 31 and 32) situated in the vicinity of each outer circumferential face of the covering lid layer 60 in correspondence to the outer face portion in the shape of a square deprived of one side of the adhesive layer 50. Incidentally, the evaporation-suppressing layer 220 is formed of the same material as the evaporation-suppressing layer 40.

Further, in the present seventh embodiment, after the platinum resistor 20, the evaporation-suppressing layer 40, the adhesive layer 50 and the covering lid layer 60 are formed on the surface 11 of the substrate 10 in the same manner as described in the first embodiment, the evaporation-suppressing layer 220 is formed in a manner such that it takes the constitution as described above.

Still further, the evaporation-suppressing layer 220 is formed by applying a platinum paste along the outer circumferential face portion in the shape of a square deprived of one side of each of the substrate 10, the adhesive layer 50 and the covering lid layer 60 in a manner such that it has the constitution as described above and, then, by firing the resultant article.

Based on the above constitution, in the present seventh embodiment, since the evaporation-suppressing layer 220 is adopted in addition to the evaporation-suppressing layer 40, the entire volume of the evaporation-suppressing layer as part of the temperature sensor becomes large in the same manner as in the sixth embodiment. Therefore, the platinum vapor pressure generated by both evaporation-suppressing layers 40 and 220 due to the high-temperature oxidative gas is increased more than in the case in which the evaporation-suppressing layer 40 is solely used. As a result, the evaporation of the platinum resistor 20 is more favorably suppressed. Other action effects than those described above are the same as in the first embodiment.

Eighth Embodiment

Figure 33:
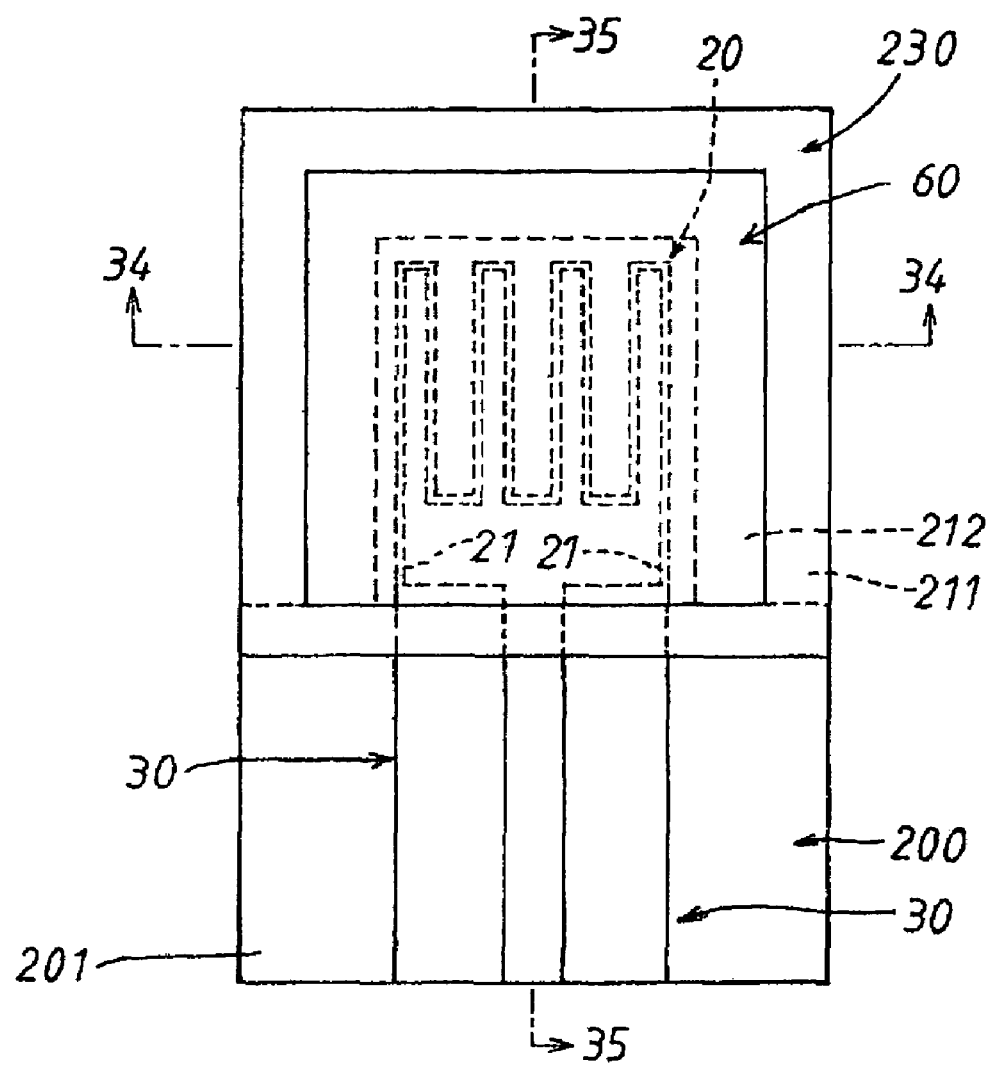
FIG. 33 is a plan view showing a eighth embodiment of a temperature sensor according to the present invention.
Figure 34:
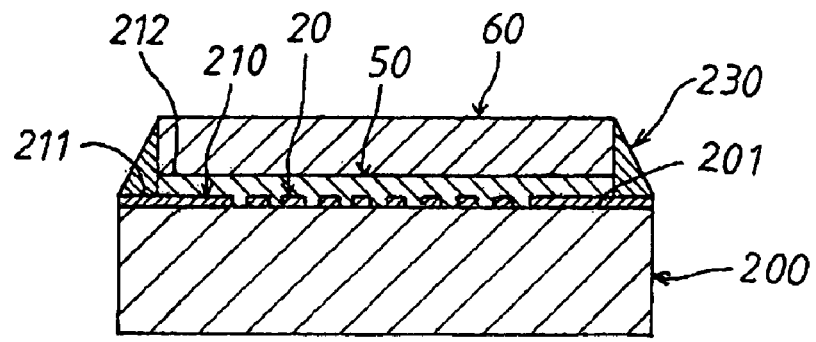
FIG. 34 is a cross-sectional view taken on line 34-34 in FIG. 33.
Figure 35:
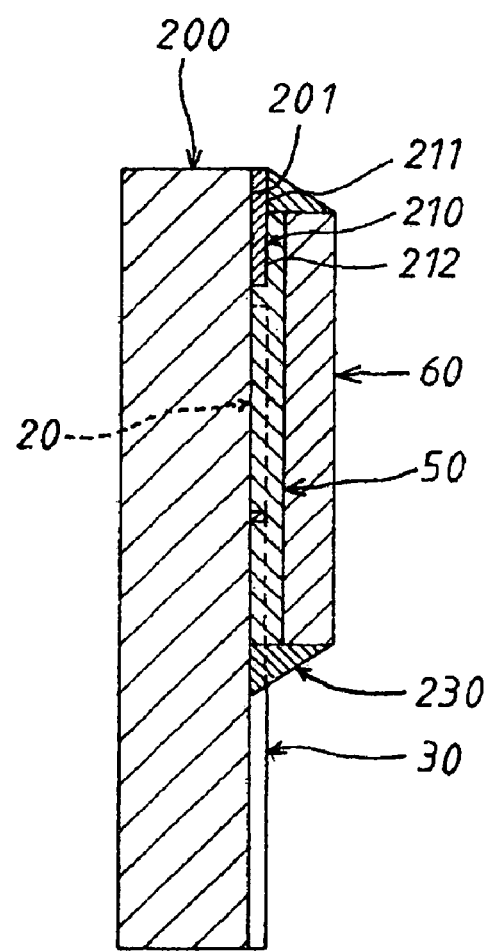
FIG. 35 is a cross-sectional view taken on line 35-35 in FIG. 33.

FIGS. 33 to 35, wherein reference numerals not expressly mentioned below designate the same parts of the invention as described above with respect to any of the previous Figures, show an eighth embodiment according to the present invention. The eighth embodiment has a constitution in which a circular sealing layer 230 comprising a glass material is additionally provided in the sixth embodiment.

The sealing layer 230 is, as shown in FIGS. 33 to 35, formed on an upper-side portion shown in FIG. 33 of the surface 201 of the substrate 200 via the outer-side suppressing layer 211 in the shape of a square deprived of one side of the evaporation-suppressing layer 210 and the side portion, in the vicinity of the platinum resistor 20, of both leads 30 as described in the sixth embodiment in a manner that covers each outer circumferential face of the adhesive layer 50 and the covering lid layer 60. Other effects than those described above are same as in the sixth embodiment.

In the eighth embodiment constituted as described above, the sealing layer 230 is formed on the upper-side portion shown in FIG. 33 of the surface 201 of the substrate 200 via the outside suppressing layer portion 211 in the shape of a square deprived of one side of the evaporation-suppressing layer 210 and a side portion, in the vicinity of the platinum resistor 20, of both leads 30 in a manner that covers each outer circumferential face of the adhesive layer 50 and the covering lid layer 60.

Therefore, an interface between the adhesive layer 50 and the substrate 200 or the evaporation-suppressing layer 210, or an interface between the adhesive layer 50 and the covering lid layer 60 is sealed by the sealing layer 230 from the high-temperature oxidative gas in the firing atmosphere or the high-temperature oxidative gas in an atmosphere in the exhaust pipe of the internal combustion engine. As a result, since the platinum resistor 20 is favorably blocked from the oxidative gas, together with an action of the platinum vapor pressure of the evaporation-suppressing layer 210, the evaporation of the platinum resistor 20 by the oxidative gas is more favorably suppressed. Other effects than those described above are the same as in the sixth embodiment.

Further, at the formation of the sealing layer 230, before or after the firing, a glass paste is applied on the upper-side portion shown in FIG. 33 of the surface 201 of the substrate 200 via an outside suppressing portion 211 in the shape of a square deprived of one side of the evaporation suppressing layer 211 and a side portion, in the vicinity of the platinum resistor 20, of both leads 30 in a manner that covers the adhesive layer 50 and the covering lid layer 60 and, then, fired simultaneously with the firing of the adhesive layer 50 or after the firing of the adhesive layer 50, to thereby form the sealing layer 230.

Ninth Embodiment

Figure 36:
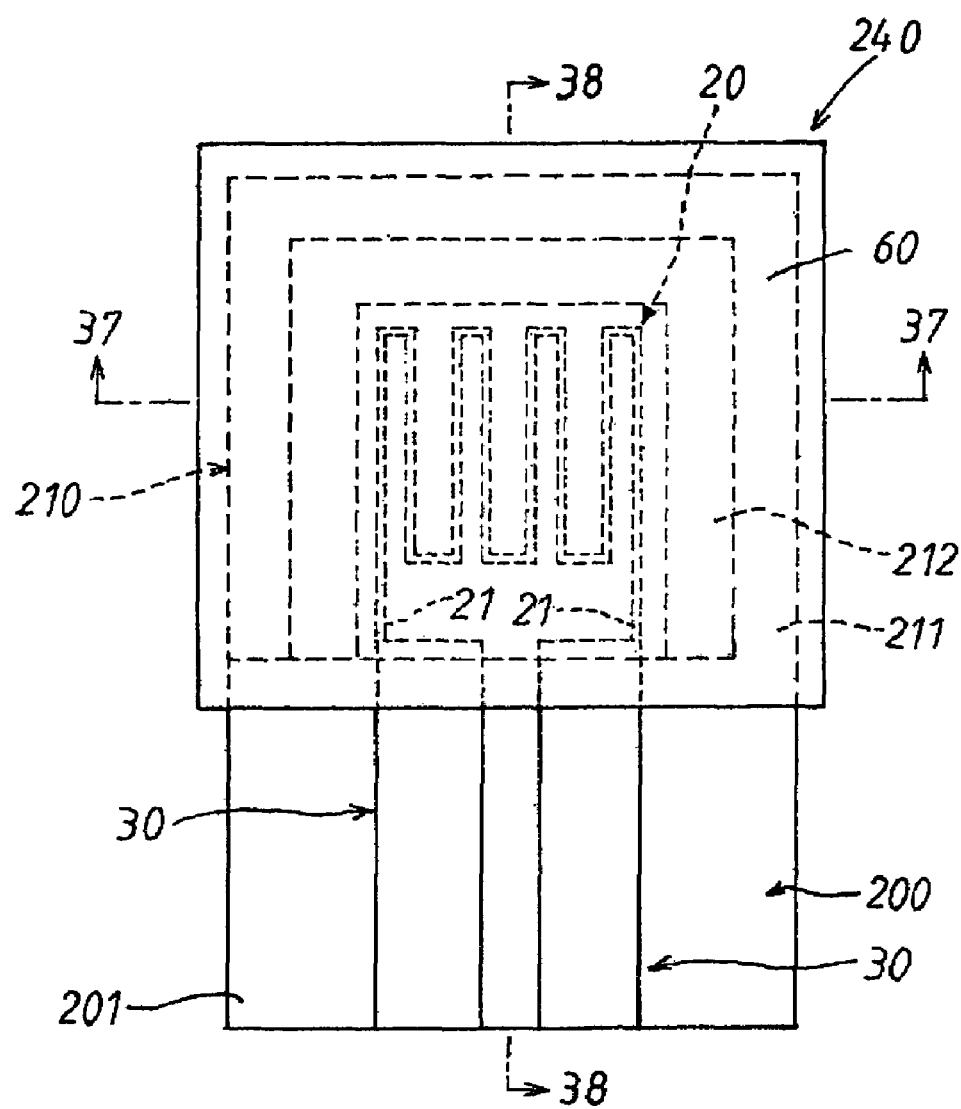
FIG. 36 is a plan view showing a ninth embodiment of a temperature sensor according to the present invention.
Figure 37:
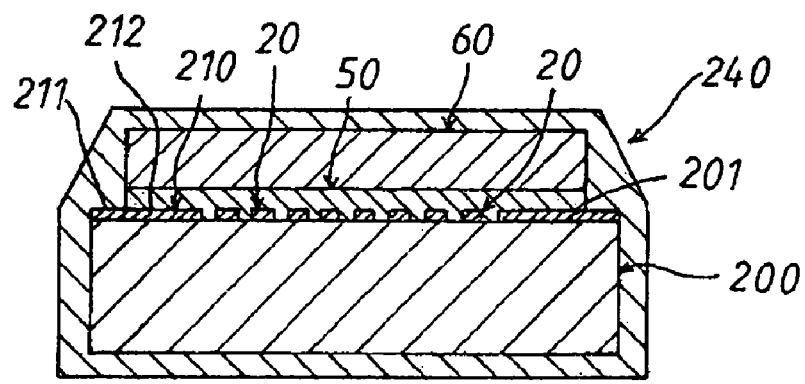
FIG. 37 is a cross-sectional view taken on line 37-37 in FIG. 36.
Figure 38:
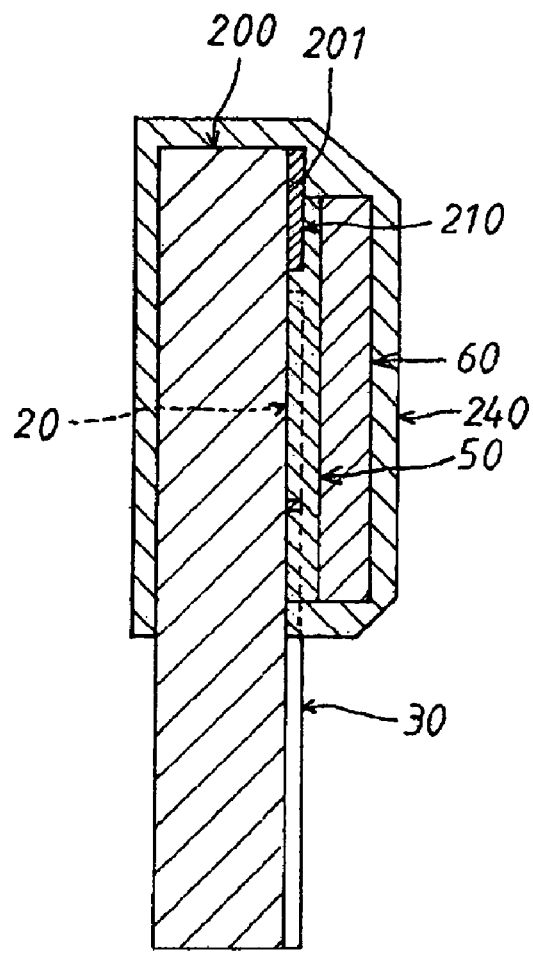
FIG. 38 is a cross-sectional view taken on line 38-38 in FIG. 36.

FIGS. 36 to 38, wherein reference numerals not expressly mentioned below designate the same parts of the invention as described above with respect to any of the previous Figures, show a ninth embodiment according to the present invention. In the ninth embodiment, a constitution in which a sealing layer 240 is additionally provided in the sixth embodiment is adopted.

The sealing layer 240 is, as shown in FIGS. 36 to 38, formed by using a glass material in a manner that encloses the temperature sensor as described in the sixth embodiment from outside excluding the lower-side portion shown in the figure. Further, the lower-side portion shown in the figure does not include a portion corresponding to a portion, in the vicinity of the adhesive layer 50, of both leads 30 of the temperature sensor as described in the sixth embodiment. Other constitutions than those as described above are the same in the sixth embodiment.

In the ninth embodiment constituted as described above, since the sealing layer 240 is formed in the manner as described above, an interface between the adhesive layer 50 and the substrate 200 or the evaporation suppressing layer 210, or an interface between the adhesive layer 50 and the covering lid layer 60 is sealed by the sealing layer 240 from the high-temperature oxidative gas in the firing atmosphere or the high-temperature oxidative gas in an atmosphere in the exhaust pipe of the internal combustion engine.

For this account, since the platinum resistor 20 is favorably blocked from the oxidative gas, in the same manner as described in the eighth embodiment, together with an action of the platinum vapor pressure of the evaporation-suppressing layer 210, the evaporation of the platinum resistor 20 by the oxidative gas is more favorably suppressed. Other effects than those described above are same as in the sixth embodiment.

Tenth Embodiment

Figure 39:
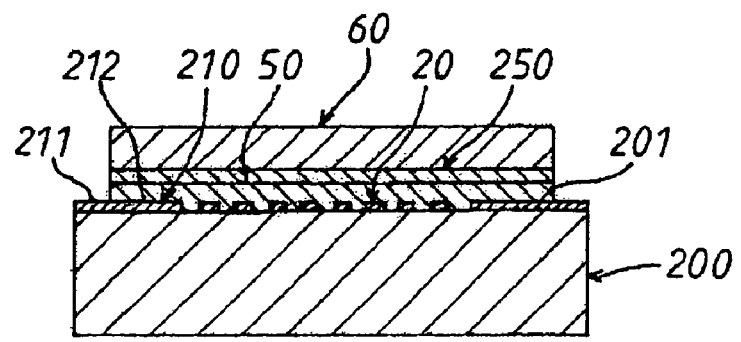
FIG. 39 is a transverse cross-sectional view showing a tenth embodiment of a temperature sensor according to the present invention.
Figure 40:
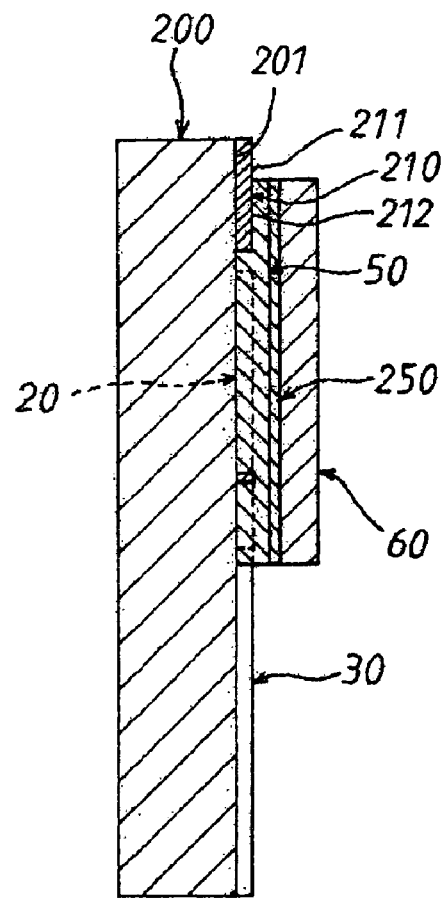
FIG. 40 is a vertical cross-sectional view showing the tenth embodiment of the temperature sensor according to the present invention.

FIGS. 39 and 40, wherein reference numerals not expressly mentioned below designate the same parts of the invention as described above with respect to any of the previous Figures, show a tenth embodiment of a temperature sensor according to the present invention. The tenth embodiment has a constitution in which an evaporation-suppressing layer 250 is adopted in addition to the evaporation-suppressing layer 210, in a temperature sensor as described in the above sixth embodiment.

The evaporation-suppressing layer 250 is, as shown in FIGS. 39 and 40, inserted between the adhesive layer 50 and the covering lid layer 60. On this occasion, the evaporation-suppressing layer 250 is formed in a laminar state of the same material (platinum) as in the evaporation-suppressing layer 210 over the entire surface of the adhesive layer 50. Further, the covering lid layer 60 is provided in a laminar state over the entire surface of the evaporation-suppressing layer 250. Other constitutions than those as described above are the same as in the sixth embodiment.

Further, at the production of the temperature sensor according to the present tenth embodiment, the evaporation-suppressing layer 250 is formed on the rear face of the covering lid layer 60 by using platinum by means of sputtering and, then, the evaporation-suppressing layer 250 is laminated on the paste layer such that the face opposite to the covering lid layer 60 of the evaporation-suppressing layer 250 is situated at the side of the paste layer which becomes the adhesive layer 50 and, then, fired in the firing atmosphere. Other production processes than that as described above are the same as in the first embodiment.

In the present tenth embodiment constituted in the manner as described above, in addition to the evaporation-suppressing layer 210, the evaporation-suppressing layer 250 are, as described above, inserted between the adhesive layer 50 and the covering lid layer 60 while being spread over the entire face of the interface between the adhesive layer 50 and the covering lid layer 60.

Therefore, the high-temperature oxidative gas as described above comes in contact with both of an outer surface of the outside suppressing portion 211 of the evaporation-suppressing layer 210 and an outer circumferential portion of the evaporation-suppressing layer 250. For this account, both evaporation-suppressing layers 210 and 250 are evaporated by the influence of the high-temperature oxidative gas.

Along with such evaporation, the platinum vapor pressure generated by the evaporation of both evaporation-suppressing layers 210 and 250 passes through the adhesive layer 50 and becomes high in the vicinity of the platinum resistor 20. On this occasion, since the evaporation-suppressing layer 250 is, as described above, formed over the entire face of the adhesive layer 50, the platinum vapor pressure generated from the evaporation-suppressing layer 250 acts over the platinum resistor 20 in concert with the platinum vapor pressure generated from the evaporation-suppressing layer 210.

Therefore, the platinum vapor pressure generated from the evaporation-suppressing layer 250, while acting over the platinum resistor 20 as a whole, by acting in concert with the platinum vapor pressure generated from the evaporation-suppressing layer 210, is held high. For this account, the platinum vapor pressure generated from both evaporation-suppressing layers 210 and 250 favorably suppresses the evaporation of the platinum resistor 20. As a result, even when the high-temperature oxidative gas reaches the platinum resistor 20, the platinum resistor 20 is not evaporated.

Further, in the tenth embodiment, the evaporation-suppressing layer 250 may be formed by using platinum between the adhesive layer 50 and the covering lid layer 60 in a shape of, for example, zigzag or stripe.

Eleventh Embodiment

Figure 41:
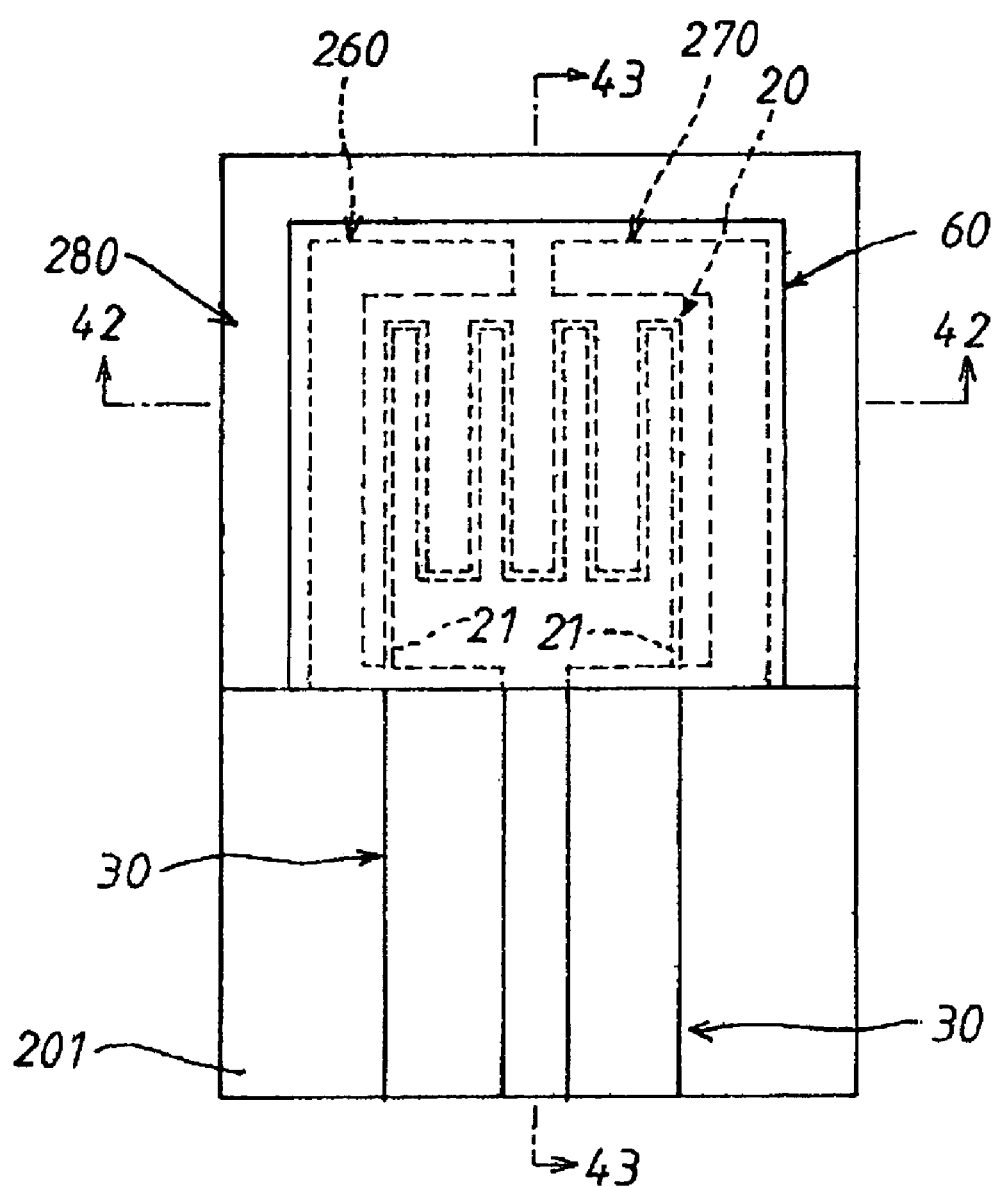
FIG. 41 is a plan view showing an eleventh embodiment of a temperature sensor according to the present invention.
Figure 42:
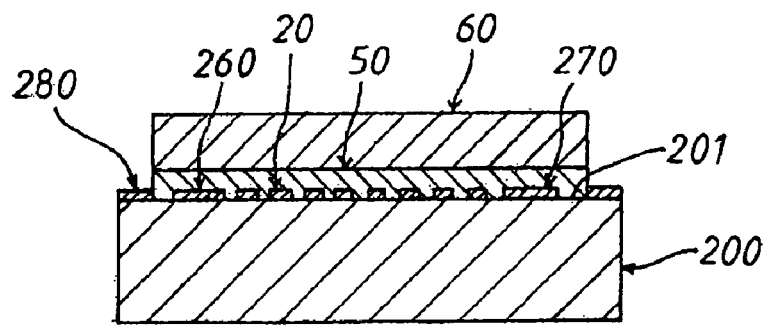
FIG. 42 is a cross-sectional view taken on line 42-42 in FIG. 41.
Figure 43:
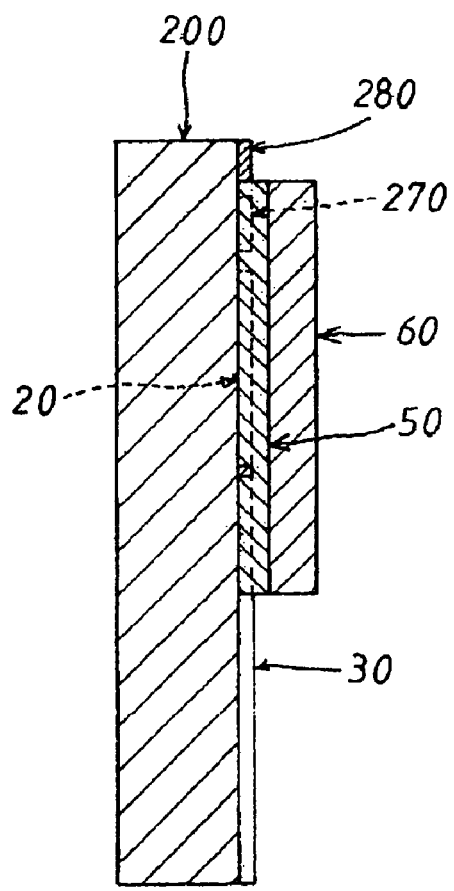
FIG. 43 is a cross-sectional view taken on line 43-43 in FIG. 41.

FIGS. 41 to 43, wherein reference numerals not expressly mentioned below designate the same parts of the invention as described above with respect to any of the previous Figures, show an eleventh embodiment according to the present invention. In the eleventh embodiment, a constitution in which both inside evaporation-suppressing layers 260 and 270, and an outside evaporation-suppressing layer 280 are provided in place of the evaporation-suppressing layer 210 in the temperature sensor as described in the sixth embodiment (FIGS. 27 to 29) is adopted.

Both inside evaporation-suppressing layers 260 and 270 are formed on the upper side portion of the surface 201 of the substrate 200 each in a shape of the letter "L" symmetrical to each other, while being embedded, in a manner that encloses the platinum resistor 20 between the rear face of the adhesive layer 50 and the upper-side portion of the surface 201 of the substrate 200 from around.

On this occasion, inside evaporation suppressing layer 260 is formed by using platinum in a manner that encloses the left-side portion shown in FIG. 41 of the platinum resistor 20 from the left-side connection terminal 21 to the center in the left-right direction of a tip end portion in the meander direction of the platinum resistor 20 in the shape of the letter "L". On the other hand, an inside evaporation-suppressing layer 270 is formed by using platinum in a manner that encloses the right-side portion shown in FIG. 41 of the platinum resistor 20 from the right-side connection terminal 21 to the center in the left-right direction of a tip end portion in the meander direction of the platinum resistor 20 in the shape of the letter "L" and the tip end portion thereof faces the tip end portion of the inside evaporation-suppressing layer 260.

In the present eleventh embodiment, the inside evaporation-suppressing layer 260 is formed so as to be in unity at a base thereof with the inner end portion of the left-side lead 30 together with the left-side connection terminal 21 of the platinum resistor 20. On the other hand, the inside evaporation-suppressing layer 270 is formed so as to be in unity, at a base thereof, with the inner end portion of the right-side lead 30 together with the right-side connection terminal 21 of the platinum resistor 20.

The outside evaporation-suppressing layer 280 is formed in the shape of a square deprived of one side by using platinum along the surface portion extending in the shape of a square deprived of one side 202 as described in the sixth embodiment in a manner that is separated from both inside evaporation-suppressing layers 260 and 270 and is exposed on the outside of the adhesive layer 50 and the covering lid layer 60. Other constitutions than that described below are the same as in the sixth embodiment.

Therefore, both inside evaporation-suppressing layers 260 and 270 perform substantially the same role as the inside evaporation-suppressing layer 212 in the shape of a square deprived of one side, while the outside evaporation-suppressing layer 280 performs substantially the same role as the outside evaporation-suppressing layer 211 in the shape of a square deprived of one side. As a result, also in the present eleventh embodiment, substantially the same effect as in the sixth embodiment can be achieved.

Twelfth Embodiment

Figure 44:
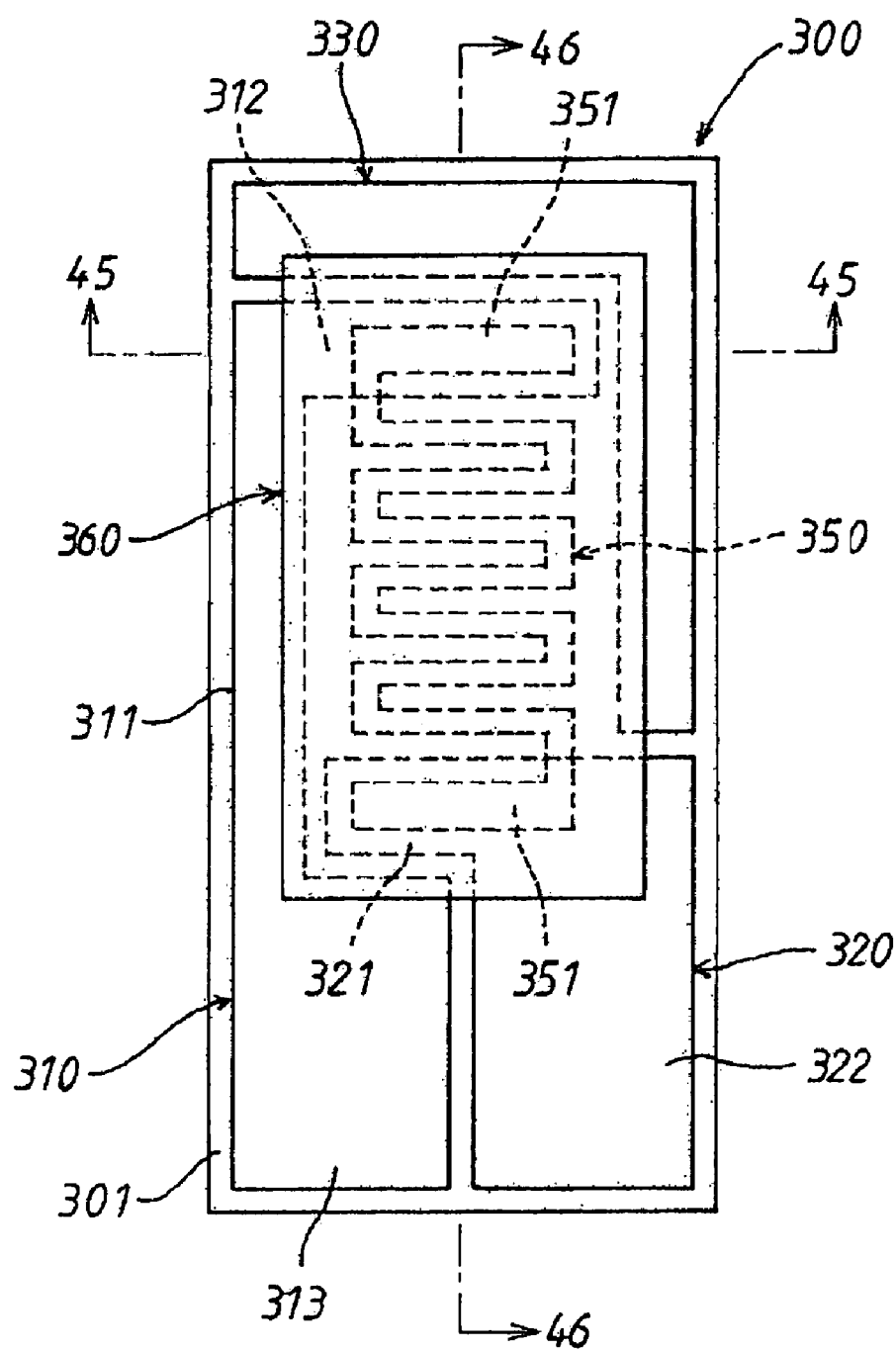
FIG. 44 is a plan view showing a twelfth embodiment of a temperature sensor according to the present invention.
Figure 45:
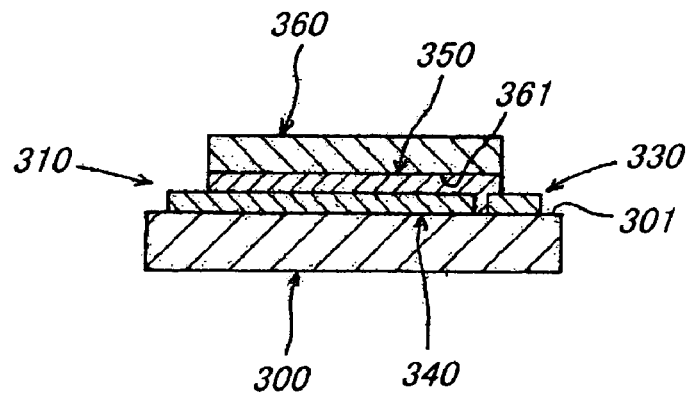
FIG. 45 is a cross-sectional view taken on line 45-45 in FIG. 44.
Figure 46:
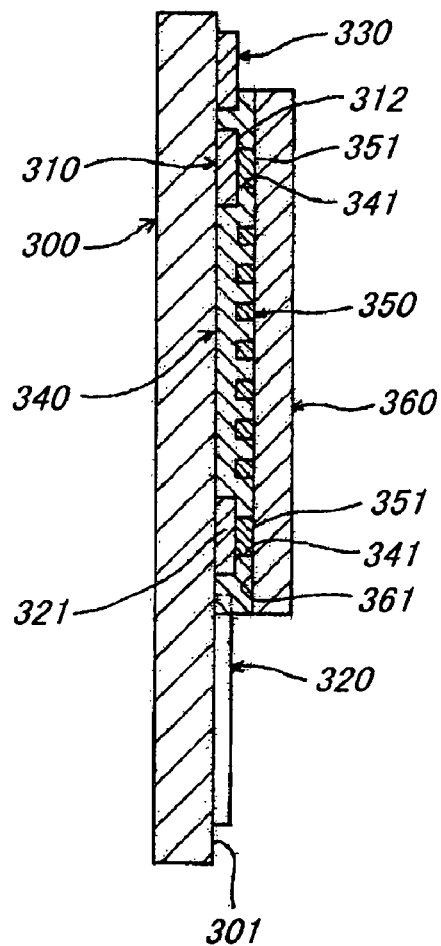
FIG. 46 is a cross-sectional view taken on line 46-46 in FIG. 44.

FIGS. 44 to 46, wherein reference numerals not expressly mentioned below designate the same parts of the invention as described above with respect to any of the previous Figures, show a twelfth embodiment of a platinum resistor temperature sensor according to the present invention. The temperature sensor comprises a covering lid layer 300. The covering lid layer 300 performs the role of support layer of the temperature sensor. Further, also in the present twelfth embodiment, the covering lid layer 300 is formed by using high-purity alumina material as described in each of the previous embodiments.

Further, the temperature sensor according to the present twelfth embodiment, as is shown by FIGS. 44 to 46, comprises left and right leads 310 and 320, and an evaporation-suppressing layer 330. Right-side lead 310 is, as shown in FIG. 44, constituted in a unity by using platinum (Pt) such that a linear lead portion 311 and an in and out both pad portions 312 and 313 are allowed to be in the shape of an approximate square deprived of one side shown in the figure.

The linear lead portion 311 is, as shown in FIG. 44, formed on the left-side portion of the surface 301 of the covering lid layer 300 in a strip shape. Inside pad portion 312 is formed in a strip shape along the surface 301 of the covering lid layer 300 in a manner that extends from the upper end portion shown in FIG. 44 of the linear lead portion 311 to the right-side thereof in the shape of the letter "L." In the present twelfth embodiment, the linear lead portion 311 performs the role of inside evaporation-suppressing layer portion together with inside pad portion 312.

Further, outside pad portion 313 is, as shown in FIG. 44, formed in a square shape along the surface 301 of the covering lid layer 300 in a manner that extends from the lower end portion of the lead portion 311 to the right-side thereof in the shape of the letter "L" on the lower portion shown at the left side in the figure of the surface 301 of the covering lid layer 300.

A right lead 320 is, as FIG. 44 shows, form-constituted to be in a unity by using platinum (Pt) such that in and out both side pad portions 321 and 322 are each allowed to be in the shape of the letter "L" as shown in the figure. Outside pad 322 is formed on the lower portion shown at the right-side in the figure of the surface 301 of the covering lid layer 300 in line with the outside pad 313 with a space therebetween. Further, the outside pad portion 322, together with the outside pad portion 313, is connected to a twin connection terminal of an exterior circuit.

An inside pad portion 321 is, as shown in FIG. 44, formed in a strip shape along the surface 301 of the covering lid layer 300 in a manner that extends from the inside end portion of outer pad portion 322 to the left-side shown in the figure.

The evaporation-suppressing layer 330 is, as shown in FIG. 44, formed to be in a unity by using platinum (Pt) along the surface 301 of the covering lid layer 300 to be in the shape of the letter "L" from the upper-side portion shown in the figure to the middle portion shown at the right side in the figure.

Further, the temperature sensor according to the present twelfth embodiment, as shown in FIGS. 45 and 46, comprises an adhesive layer 340. Adhesive layer 340 is, as shown in FIG. 44, formed along an approximately center portion of the surface 301 of the covering lid layer 300 via approximately the entire inner edge portion of the evaporation suppressing layer 330, the inner edge portion of the linear lead portion 311 of the left-side lead 310, the inside pad portion 312 and the opposing edge portion, facing the inside pad portion 312, of the outside pad portion 313, the inside pad portion 321 of the right-side lead 320 and the portion, in the vicinity of the inside pad portion 321, of the outside pad portion 322. Incidentally, the adhesive layer 340 is formed so as to have a porous structure using high-purity alumina material as described in the above first embodiment.

Further, the temperature sensor according to the present twelfth embodiment, as shown in FIGS. 44 to 46, comprises a platinum resistor 350 and a substrate 360. The platinum resistor 350, comprising platinum (Pt), is formed on rear face 361 of the substrate 360 from top to bottom shown in the figure in a meander shape in the left-right direction shown in FIG. 44. By having the constitution as described above, the platinum resistor 350 is formed such that upper and lower end portions shown in FIG. 44 are allowed to be upper and lower both side connection end portions 351. In the present twelfth embodiment, upper and lower both side end portions 351 of the platinum resistor 350 are formed in a manner that pass through upper and lower both side through-hole portions 341 (see FIG. 46) formed on the adhesive layer 340 and, then, contact with each of the inside pad portion 312 of the left side lead 310 and the inside pad portion 321 of the right-side lead 320.

The substrate 360 is formed by using a material comprising high-purity alumina ($Al_2O_3$), as described in the first embodiment, so as to have a dense structure. Further, in the present twelfth embodiment, the substrate 360 performs the same role as the covering lid layer 300 by using the covering lid layer 300 as a support layer.

A production method of the temperature sensor constituted as described above according to the present twelfth embodiment will be described. Firstly, the covering lid layer 300 is prepared. Then, the same platinum film as the platinum film 70 described in the first embodiment is formed on the entire surface 301 of the covering lid layer 300 by using platinum (Pt) by means of sputtering.

Next, the thus-formed platinum film is subjected to a predetermined patterning treatment by photolithography processing, to thereby form left and right both side leads 310 and 320 and the evaporation-suppressing layer 330 on the surface 301 of the covering lid layer 300 in a thin film state in such a manner such that it has the constitution as described above. The resultant article is, then, subjected to the aging treatment in the same manner as described in the first embodiment.

Thereafter, high-purity alumina material is applied or screen-printed in a paste state on an approximately center portion of the surface 301 of the covering lid layer 300 via nearly the entire inner edge portion of the evaporation-suppressing layer 330, an inner edge portion of a linear lead portion 311 of the left-side lead 310, the inside pad portion 312 and the opposing edge portion, facing to the inside pad portion 312, of the outside pad portion 313, the inside pad portion 321 of the right-side lead 320 and the portion, in the vicinity of the inside pad portion 321, of the outside pad portion 322, to thereby form a paste layer which becomes the adhesive layer 340. Next, the thus-formed paste layer is subjected to a patterning treatment, to thereby form the upper and lower both side through-hole portions 341.

On the other hand, then, the same platinum film as the platinum film 70 as described in the first embodiment is formed by using platinum (Pt) on the entire surface of rear face 361 of the substrate 360 comprising the high-purity alumina material by means of sputtering. Next, the thus-formed platinum film is subjected to a predetermined patterning treatment by photolithography processing, to thereby form the platinum resistor 350 on the rear face 361 of the substrate 360 in a manner such that is has the constitution as described above. The resultant article is, then, subjected to the aging treatment in the same manner as described in the first embodiment.

Thereafter, the substrate 360 is laminated on the adhesive layer 340 via the platinum resistor 350. On this occasion, pressure is applied from the side of the substrate 360 to the covering lid layer 300 to allow the platinum resistor 350 to pass through upper-lower both side through-hole portions 341 of the paste layer, which becomes the adhesive layer 340, and, then, to contact on the inside pad portion 312 of the left-side lead 310 and the inside pad portion 321 of the right-side lead 320.

A resultant structure in which the substrate 360 is laminated on the adhesive layer 340 is fired in the same firing atmosphere as described in the first embodiment, to thereby terminate the production of the temperature sensor according to the present twelfth embodiment.

The thus-produced temperature sensor is covered by the adhesive layer 340 in a state in which the platinum resistor 350 is sandwiched between the substrate 360 and the adhesive layer 340. On this occasion, the platinum resistor 350 is enclosed by the left and right both side leads 310 and 320, respectively, and the evaporation suppressing layer 330 in the shape of the letter "L".

Therefore, the high-temperature oxidative gas passes through an interface between the covering lid layer 300 and the adhesive layer 340 or an interface between the adhesive layer 340 and the substrate 360 via the evaporation-suppressing layer 330 in the shape of the letter "L" and, then, reaches the platinum resistor 350.

Now, as described above, since left and right both side leads 310 and 320 and the evaporation-suppressing layer 330 in the shape of the letter "L" are formed around the platinum resistor 350, a majority of the high-temperature oxidative gas at first reaches the left and right both side leads 310 and 320 and the evaporation-suppressing layer 330. Further, since the left and right both side leads 310 and 320 and the evaporation-suppressing layer 330 are formed by using platinum, the left and right both side leads 310 and 320 and the evaporation-suppressing layer 330 are evaporated by the high-temperature oxidative gas. For this account, the platinum vapor pressure generated by the evaporation of the left and right both side leads 310 and 320 and the evaporation-suppressing layer 330 becomes high in the vicinity of the platinum resistor 350.

Further, since the platinum resistor 350 is also formed by using platinum, the platinum resistor 350 tends to be evaporated by the high-temperature oxidative gas in the atmosphere. However, as described above, since platinum vapor pressure generated by the evaporation of the left and right both side leads 310 and 320 and the evaporation-suppressing layer 330 is high in the vicinity of the platinum resistor 350, the platinum vapor pressure favorably suppresses the evaporation of the platinum resistor 350.

Therefore, even when the high-temperature oxidative gas reaches the platinum resistor 350, the platinum resistor 350 is scarcely evaporated. As a result, the platinum resistor 350 keeps its outer figuration as is and maintains its normal resistance value as the temperature sensor.

Further, in carrying out the present invention, the present invention is not limited to the aforementioned embodiments and various modifications can be mentioned, such as, for example, those described below.

(1) In the first embodiment, the evaporation-suppressing layer 40 is not formed on the surface 11 of the substrate 10, but may be formed on the face, at the side of the substrate 10, of the adhesive layer 50.

(2) Further, in the third embodiment, instead of forming the evaporation-suppressing layer 150 over an entire interface between the adhesive layer 50 and the covering lid layer 60, the evaporation-suppressing layer 150 may be formed on a portion of the interface.

(3) The evaporation-suppressing layer 40, being different from the example as described in the first embodiment, may be formed between the adhesive layer 50 and a surface of the substrate 10 in a manner that corresponds to at least one portion of the circumference of the platinum resistor 20 in the shape corresponding to at least one portion of the circumference of the platinum resistor 20.

(4) The platinum resistors 20 and 350, leads 30, 90, 100, 310 and 320, and the evaporation-suppressing layers 40 and 330 are not limited to the thin film state but may be in a thick film state.

(5) The substrates 10 and 360, the adhesive layers 50 and 340, and the covering lid layers 60 and 300 are not limited to high-purity alumina material but may be formed by a material comprising alumina as a major component or a material ordinarily comprising ceramics as major component.

(6) The adhesive layer 50 or 340 may be a porous layer comprising a porous material. Further, the porosity of the adhesive layer 50 or 340 is preferably in the range of from 40 (%) to 70 (%).

This application is based on Japanese Patent Application No. 2004-64095 filed Mar. 8, 2004, incorporated herein by reference in its entirety.

What is claimed is:

1. A platinum resistor temperature sensor comprising: a ceramic substrate; a platinum resistor provided on the substrate; a porous layer provided on at least one portion of a circumference of the platinum resistor; and an evaporation-suppressing layer comprising platinum for suppressing evaporation of platinum of the platinum resistor being provided in the vicinity of the platinum resistor.

2. The platinum resistor temperature sensor as claimed in claim 1, wherein the porous layer comprises ceramic.

3. The platinum resistor temperature sensor as claimed in claim 1, wherein the evaporation-suppressing layer is provided between the porous layer and the platinum resistor.

4. The platinum resistor temperature sensor as claimed in claim 1, wherein the platinum resistor and the evaporation-suppressing layer are covered by the porous layer, and the evaporation-suppressing layer is positioned between the porous layer and the platinum resistor.

5. The platinum resistor temperature sensor as claimed in claim 1, wherein the evaporation-suppressing layer is in contact with the porous layer.

6. The platinum resistor temperature sensor as claimed in claim 1, wherein the porous layer is in contact with the ceramic substrate.

7. The platinum resistor temperature sensor as claimed in claim 6, wherein the evaporation-suppressing layer is provided in the porous layer.

8. The platinum resistor temperature sensor as claimed in claim 1, wherein the evaporation-suppressing layer is made of platinum and is provided between the porous layer and the ceramic substrate.

9. The platinum resistor temperature sensor as claimed in claim 8, wherein the substrate and the evaporation-suppressing layer extend outwardly farther than the porous layer; or, the substrate extends outwardly farther than the porous layer and the evaporation-suppressing layer is formed on the extended portion of the substrate.

10. The platinum resistor temperature sensor as claimed in claim 1, wherein the platinum resistor has a meandering line shape; and the evaporation-suppressing layer is provided so as to correspond to at least one portion of the meandering-shaped platinum resistor.

11. The platinum resistor temperature sensor as claimed in claim 4, further comprising two leads formed on the substrate and extended from connection end portions of the platinum resistor; wherein the evaporation-suppressing layer is formed in a horseshoe shape and is provided at an opposite side of the connection portions of the platinum resistor.

12. The platinum resistor temperature sensor as claimed in claim 1, further comprising a ceramic lid layer covering the porous layer and encapsulating the platinum resistor.

13. The platinum resistor temperature sensor as claimed in claim 11, wherein the evaporation-suppressing layer is provided between the porous layer, and the covering lid layer.

14. The platinum resistor temperature sensor as claimed in claim 6, further comprising a sealing layer comprised of a glass material, which covers the porous layer.

15. The platinum resistor temperature sensor as claimed in claim 2, wherein the evaporation-suppressing layer is provided between the porous layer and the platinum resistor.

16. The platinum resistor temperature sensor as claimed in claim 2, wherein the platinum resistor and the evaporation-suppressing layer are covered by the porous layer, and the evaporation-suppressing layer is positioned between the porous layer and the platinum resistor.

17. The platinum resistor temperature sensor as claimed in claim 2, wherein the evaporation-suppressing layer is in contact with the porous layer.

18. The platinum resistor temperature sensor as claimed in claim 2, wherein the platinum resistor has a meandering line shape; and the evaporation-suppressing layer is provided so as to correspond to at least one portion of the meandering-shaped platinum resistor.

19. The platinum resistor temperature sensor as claimed in claim 7, further comprising a sealing layer comprised of a glass material, which covers the porous layer.

* * * * *